United States Patent
Scicluna

(10) Patent No.: US 9,805,431 B2
(45) Date of Patent: Oct. 31, 2017

(54) SYSTEMS AND METHODS FOR ALLOCATING NETWORKED VEHICLE RESOURCES IN PRIORITY ENVIRONMENTS

(71) Applicant: Addison Lee Limited, London (GB)

(72) Inventor: Larry Scicluna, Rochester (GB)

(73) Assignee: Addison Lee Limited, London (GB)

( * ) Notice: Subject to any disclaimer, the term of this patent is extended or adjusted under 35 U.S.C. 154(b) by 0 days.

(21) Appl. No.: 15/051,948

(22) Filed: Feb. 24, 2016

(65) Prior Publication Data
US 2016/0247247 A1 Aug. 25, 2016

(30) Foreign Application Priority Data
Feb. 24, 2015 (GB) .................................. 1503083.6

(51) Int. Cl.
| | | |
|---|---|---|
| G06F 17/30 | (2006.01) | |
| G06Q 10/02 | (2012.01) | |
| G06Q 50/30 | (2012.01) | |
| G06Q 10/06 | (2012.01) | |

(52) U.S. Cl.
CPC ......... G06Q 50/30 (2013.01); G06F 17/3087 (2013.01); G06Q 10/02 (2013.01); G06Q 10/025 (2013.01); G06Q 10/06315 (2013.01)

(58) Field of Classification Search
CPC ..................... G06Q 10/0631; G06Q 10/06315
See application file for complete search history.

(56) References Cited

U.S. PATENT DOCUMENTS

| | | |
|---|---|---|
| 2002/0034292 A1 | 3/2002 | Tuoriniemi |
| 2003/0065556 A1 | 4/2003 | Takanashi et al. |
| 2004/0093280 A1* | 5/2004 | Yamaguchi ........ G06Q 30/0601 705/26.1 |
| 2004/0236501 A1 | 11/2004 | Hirose et al. |

(Continued)

FOREIGN PATENT DOCUMENTS

| | | |
|---|---|---|
| CN | 102831769 | 12/2012 |
| JP | 2012190237 | 10/2012 |

(Continued)

OTHER PUBLICATIONS

"Multi-Agent Real Time Scheduling System for Taxi Companies", May 10-15, 2009, 8th International Conference on Autnomous Agents and Multiagents Systems, all pages.*

(Continued)

Primary Examiner — Brian Epstein
Assistant Examiner — Omar Zeroual
(74) Attorney, Agent, or Firm — Michael D. Downs; Fincham Downs LLC

(57) ABSTRACT

Systems, methods, apparatus, and computer-readable media provide for allocating vehicle resources to future vehicle requirements based on priority environments, such as in or near 'hot spots,' or other priority locations, where requests for vehicle resources are or are expected to be particularly high. In one embodiment, a vehicle resource allocation system allocates vehicles to requested locations such that vehicles of a fleet become more readily available to a hot spot, without requiring vehicles to be directed specifically to the hot spot.

27 Claims, 13 Drawing Sheets

(56) References Cited

U.S. PATENT DOCUMENTS

| | | | |
|---|---|---|---|
| 2006/0059023 A1* | 3/2006 | Mashinsky | G06Q 10/02 705/5 |
| 2008/0114629 A1* | 5/2008 | Pavlov | G06Q 10/08 705/347 |
| 2008/0125968 A1 | 5/2008 | Bradicich et al. | |
| 2008/0186958 A1 | 8/2008 | O'Sullivan | |
| 2008/0312822 A1 | 12/2008 | Lucas et al. | |
| 2009/0172009 A1 | 7/2009 | Schmith et al. | |
| 2009/0204600 A1 | 8/2009 | Kalik et al. | |
| 2009/0313077 A1* | 12/2009 | Wheeler, IV | G01C 21/26 705/7.14 |
| 2011/0064211 A1 | 3/2011 | Wu | |
| 2011/0099040 A1* | 4/2011 | Felt | G06F 17/3087 705/7.12 |
| 2011/0313804 A1 | 12/2011 | Camp et al. | |
| 2012/0041675 A1 | 2/2012 | Juliver | |
| 2013/0246207 A1* | 9/2013 | Novak | G06Q 30/0283 705/26.2 |
| 2013/0297463 A1* | 11/2013 | Garber | G06Q 10/087 705/28 |
| 2014/0026065 A1 | 1/2014 | Wang | |
| 2014/0108201 A1* | 4/2014 | Frechette | G06Q 20/3224 705/26.62 |
| 2014/0129951 A1* | 5/2014 | Amin | G06Q 50/30 715/738 |
| 2014/0180741 A1* | 6/2014 | Franke | G06Q 10/06315 705/7.14 |
| 2014/0309815 A1* | 10/2014 | Ricci | H04W 48/04 701/2 |
| 2015/0046083 A1* | 2/2015 | Maitra | G08G 1/123 701/465 |
| 2015/0161564 A1* | 6/2015 | Sweeney | G06Q 10/06311 705/338 |
| 2015/0223024 A1* | 8/2015 | Abuodeh | H04W 4/02 455/456.3 |
| 2016/0132792 A1 | 5/2016 | Rosnow | |
| 2016/0247109 A1 | 8/2016 | Scicluna et al. | |
| 2016/0248914 A1 | 8/2016 | Lacey | |
| 2016/0342946 A1* | 11/2016 | Herraiz Herraiz | G06Q 10/08 |
| 2016/0364812 A1* | 12/2016 | Cao | G06Q 50/30 |
| 2016/0364823 A1* | 12/2016 | Cao | G06Q 10/1095 |
| 2017/0160092 A1* | 6/2017 | Botea | G01C 21/3407 |

FOREIGN PATENT DOCUMENTS

| | | |
|---|---|---|
| JP | 2013134641 | 7/2013 |
| KR | 20120002764 | 1/2012 |
| KR | 10-2013-0082567 | 7/2013 |

OTHER PUBLICATIONS

Written Opinion for PCT/IB2016/051005 filed Feb. 24, 2106 dated May 31, 2016.
International Search Report for PCT/IB2016/051005 filed Feb. 24, 2106 dated May 31, 2016.
Combined Search and Examination Report for Application No. GB1503084.4 dated Aug. 25, 2015; 6 pages.
English Abstract and Bibliographic Data for CN102831769 (website: http://worldwide.espacenet.com/publicationDetails/biblio? . . . ) download dated Mar. 24, 2016; 1 page.
English Abstract and Bibliographic Data for KR20120002764 (website: http://worldwide.espacenet.com/publicationDetails/biblio?CC=KR . . . ) download dated Mar. 24, 2016; 1 page.
Office Action for U.S. Appl. No. 15/051,920 dated Sep. 15, 2016; 7 pps.
Final Office Action for U.S. Appl. No. 15/051,920 dated Mar. 17, 2017; 7 pps.
Written Opinion for PCT/IB2016/051012 filed Feb. 24, 2016, dated May 25, 2016; 11 pps.
International Search Report for PCT/IB2016/051012 filed Feb. 24, 2016, dated May 25, 2016; 3 pps.
Office Action for U.S. Appl. No. 15/051,956 dated Sep. 2, 2016; 26 pps.
Final Office Action for U.S. Appl. No. 15/051,956 dated Jan. 26, 2017; 30 pps.
Glaschenko et al. "Multi-Agent Real Time Scheduling System for Taxi Companies" AAMAS 2009—8th International Conference for Autonomous Agents and Multiagent Systems; May 10-15, 2009, Budapest Hungary; 36 pps.
Website: (https://www.youtube.com/watch?v=T3qGB_eSAFs) SherlockTaxi—Allocation Demo; published Mar. 28, 2014; access date: Jun. 9, 2017.
Website: (https://vimeo.com/113022930) Addison Lee Auto Allocator; access date: Jun. 9, 2017.
Website: (https://www.youtube.com/watch?v=ZVExf-Mz8Mo&t=1s) Addison Lee at Google PinPoint London 2012; Published Nov. 12, 2012; access date: Jun. 9, 2017.

* cited by examiner

SYSTEMS AND METHODS FOR ALLOCATING NETWORKED VEHICLE RESOURCES IN PRIORITY ENVIRONMENTS

FIELD OF THE INVENTION

The present invention relates to systems for allocating mobile resources, using a communications network, to desired locations, and in particular relates to automatically managing the presence of vehicle resources in areas including, or near, priority environments.

BACKGROUND OF THE INVENTION

In the field of fleet vehicle management (e.g., delivery trucks, private hire vehicles and taxis), historically vehicles and drivers were allocated to bookings by a human operator, called a controller. The controller would be in contact with the drivers of vehicles of a fleet by voice channels (typically one shared voice channel) of a radio system, through which the controller and the drivers could speak with one another. The controller could ascertain the locations of drivers by requesting the drivers to provide their locations verbally. The controller could also enquire of drivers when they expected to drop passengers and thus become free again for fulfilling a booking. Drivers would be provided with details of bookings allocated to them by the controller verbally through the radio system. Such manual systems are still widely in use.

Automated allocation of vehicles (e.g., using a communications network to communicate with remote vehicle resources) provides some challenges, one of which is managing the vehicles such that they are suitably located to respond to demand for the vehicles. If vehicles are suitably located, then requests can be fulfilled relatively quickly because the journey time from an available vehicle to the desired location is relatively low. Automatically assigning the vehicle nearest to the desired location, however, may not take into account other factors contributing to the overall efficiency of how vehicles and other mobile resources are allocated.

BRIEF DESCRIPTION OF THE FIGURES

Embodiments of the invention will now be described, by way of example only, with reference to the accompanying drawings, in which.

DETAILED DESCRIPTION OF SOME EMBODIMENTS OF THE INVENTION

Figure 1:
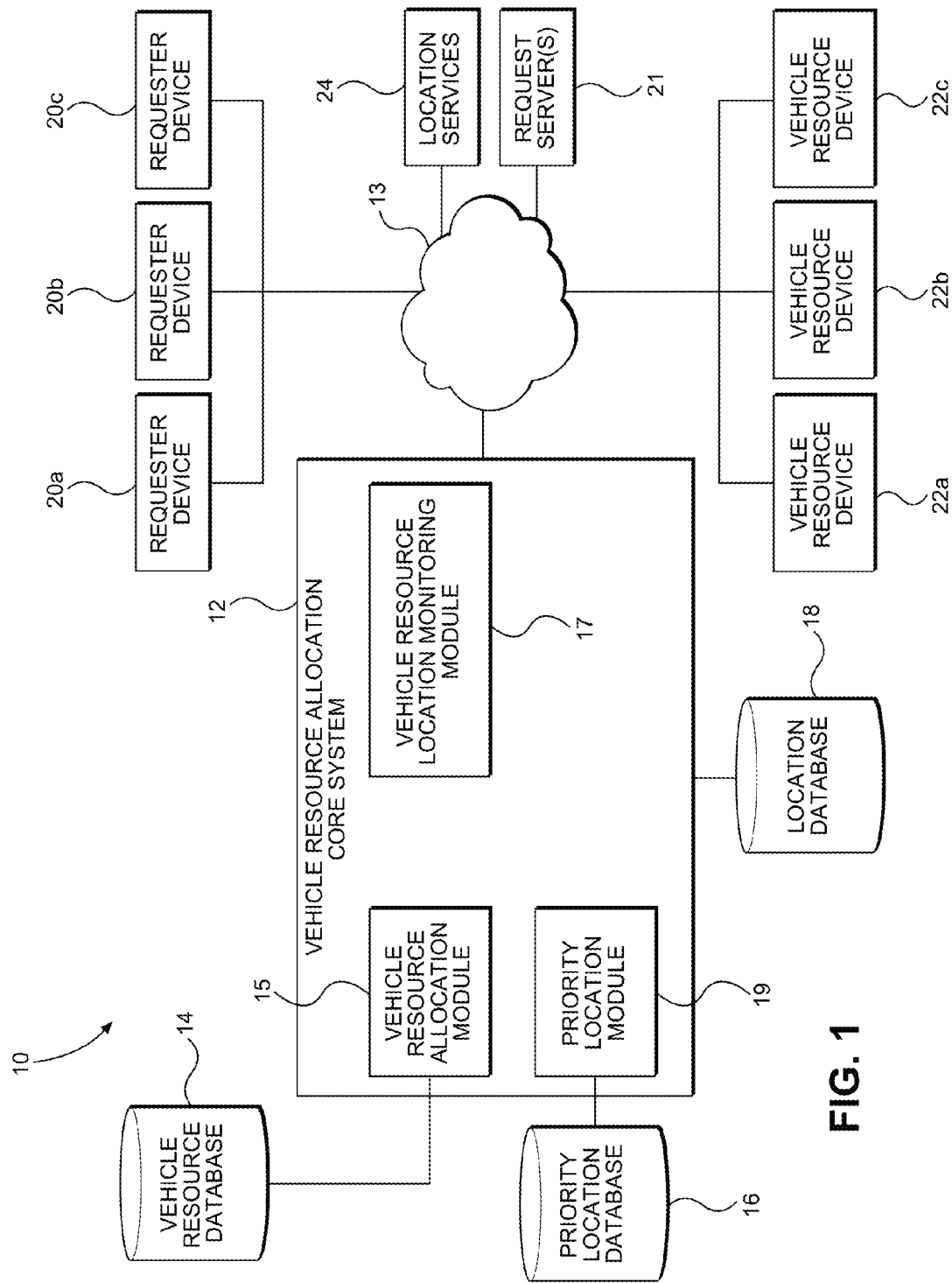
FIG. 1 is a schematic diagram of a system for management of a plurality of vehicle resources according to various aspects of the present invention.

In brief, various embodiments of the present invention allow for priority locations (also referred to in this disclosure as 'hot spots') to be created and/or identified within a vehicle resource allocation system. A hot spot is a location or area where demand for vehicles and/or other types of mobile resources is or is expected to be particularly high (e.g., relative to other locations). As discussed in this disclosure, a hot spot may be associated with an area outside of but proximate to the hot spot (referred to in this disclosure as an 'extended priority zone'). The extended priority zone may not have the particularly high demand of its associated hot spot. The extended priority zone may be defined, in some embodiments, by an 'attraction distance' and/or by a specific geographical area (e.g., surrounding a hot spot). In this disclosure, a hot spot and its associated extended priority zone may be referred to, collectively, as a 'priority environment.'

In accordance with some embodiments, in meeting requests for vehicle resources, the vehicle resource allocation system assigns vehicles to particular locations (e.g., requested destinations or objectives) such that vehicles of a fleet may be attracted to a hot spot organically and without requiring vehicles to be directed specifically to the hot spot. Moreover, this is achieved automatically.

If vehicles are suitably located, then, in accordance with some embodiments, requests which require a vehicle as soon as possible can be fulfilled relatively quickly because the journey time from an available vehicle to a requested location (e.g., an emergency vehicle to a traffic accident, a private taxi to the pickup location of a booking) is relatively low. Advance requests (e.g., scheduled deliveries, taxi bookings) also can be met more efficiently. This also contributes to minimizing distances travelled by the vehicles of the fleet, reducing fuel costs, improving vehicle utilization, reducing vehicle wear and tear and reducing driver fatigue.

The vehicle resource allocation system, in accordance with some embodiments, allocates vehicles to one or more particular locations, such as in response to a request for a vehicle resource received over a communication network, and/or in response to another indication of a need (or potential need) for a vehicle resource at a particular location. Requests for vehicle resources may include any number of particular locations, such as in the case where a vehicle is assigned a task to transport goods and/or people from a first location (e.g., a pick up location) to a second location (e.g., a drop off location), or to travel a particular route including two or more specific locations (e.g., points of interest, patrol waypoints).

Various types of vehicle resources may be managed in accordance with various aspects of the present invention. In one example, a police, fire, emergency medical transport, or other type of first responder system, may need to allocate vehicles (e.g., emergency vehicles, police vehicles) to specific locations, such as the scene of an accident, the location of a crime or crime victim, or other area requiring response services. In another example, a search and rescue operation may need to allocate vehicles and/or mobile personnel to a specific location (e.g., a specific search location within a larger search grid), such as in response to a reported lead, sighting, or other relevant information. In another example, a vehicle resource allocation system of a private hire booking service may allocate vehicles (e.g., private taxis) to pick up and drop off travelers.

Vehicle resources may include, by way of example and without limitations, land vehicles (e.g., cars, trucks, taxis, construction equipment, etc.), watercraft (e.g., boats, ships, etc.), aircraft (e.g., airplanes, helicopters, aerial drones, etc.), and/or spacecraft. Although some example vehicles discussed in this disclosure are described as having drivers, it will be readily understood that vehicles that may be allocated in accordance with embodiments of the present invention may be manned or autonomous (unmanned), may be operated by a human operator with the vehicle, and/or may be operated remotely by a human and/or computer operator.

In accordance with some embodiments, the vehicle allocation system allocates requested vehicle resources based on scores calculated for each vehicle. In some embodiments, a respective score for a vehicle may take into account one or more of: the vehicle's current proximity to a hot spot, whether the vehicle is currently within an extended priority zone or priority environment, and/or the distance from a hot spot to the requested destination for the vehicle. According to one embodiment, the system downscores vehicles for requests that do not start within a hot spot, if the vehicle is within a certain range of the hot spot. This results in an increased likelihood that vehicles that are not close to the hot spot will be allocated to the request, allowing vehicles that are close to the hot spot to remain available for allocation to requests that do start within the hot spot.

In some embodiments, the allocation system upscores vehicles of a type that are desired in a hot spot if the requested vehicle resource is to be assigned a particular location (e.g., a final destination of an assigned military or police patrol; a drop off location for a taxi booking) that is in or near to the hot spot, in relation to scores for vehicles of a different type.

In one or more embodiments, the present invention relates to allocating vehicles to private hire bookings and in particular relates to automatically attracting private hire vehicles to fulfill customer bookings in a hot spot area of actual or predicted relatively high demand for private hire vehicles. If vehicles are suitably located, then instant bookings (bookings which require a vehicle as soon as possible) can be fulfilled relatively quickly because the journey time from an available vehicle to the pickup location of the booking is relatively low, and advance bookings also can be met more efficiently. This also contributes to minimizing distances travelled by the vehicles of the fleet, reducing fuel costs, improved vehicle utilization, reduced vehicle wear and tear and reduced driver fatigue. Further advantages can be felt in terms of customer satisfaction and driver wellbeing and happiness.

In accordance with some embodiments, a vehicle resource allocation controller device for allocating vehicle resources is in communication with a plurality of vehicle resource devices and a plurality of requester devices, and is adapted to execute a vehicle resource allocation module for dynamically allocating vehicle resources (e.g., in response to requests from requester devices) by performing one or more of the operations described in this disclosure. In some embodiments, the vehicle resource allocation controller device monitors the locations of the plurality of vehicle resources (e.g., by receiving geolocation information about the location of a vehicle resource device associated with the vehicle resource).

In accordance with some embodiments, systems for allocating networked vehicle resources provide for one or more of:
  a plurality of vehicle resource devices (e.g., each vehicle resource device being associated with a respective vehicle resource of a plurality of vehicle resources);
  a plurality of requester devices (e.g., each requester device being associated with a respective requester of vehicle resources);
  a vehicle resource allocation controller device;
  a priority location (hot spot) database;
  a vehicle resource allocation module;
  a vehicle resource database;
  a vehicle resource location monitoring module;
  a priority location module for managing information about and/or defining hot spots;
  a map and/or location database; and/or
  at least one location service (e.g., a global positioning system (GPS), a Wi-Fi® network device-based location service).

In accordance with some embodiments, systems, methods, apparatus, and computer-readable media for allocating networked vehicle resources provide for:
  identifying a priority location;
  determine an extended location priority zone associated with the priority location;
  receiving (e.g., from a requester device), a request to provide a vehicle resource at a first location;
  receiving a second request to provide a vehicle resource at a second location; and
  allocating a vehicle resource, from the plurality of vehicle resources, to at least one of the first location and the second location, based on the extended priority zone.

In accordance with some embodiments, systems, methods, apparatus, and computer-readable media for allocating networked vehicle resources provide for:
  receiving a request to send a vehicle resource to a first location;
  determining that the first location is outside a priority location;

for each of a plurality of vehicle resources, determining whether the vehicle is located within an extended priority zone associated with the priority location; and for each vehicle resource located within the extended priority zone, determining a respective priority environment score.

In accordance with some embodiments, systems, methods, apparatus, and computer-readable media for allocating networked vehicle resources provide for:

receiving a request to send a vehicle resource to a first location;

identifying a vehicle resource of a plurality of vehicle resources;

determining that the vehicle resource is within an extended priority zone associated with a priority location;

determining whether the vehicle resource is currently available for allocation;

determining a distance by performing one of:
  if the vehicle resource is currently available for allocation, determining a distance from the priority location to a current location of the vehicle resource, or
  if the vehicle resource is not currently available for allocation, determining a distance from the priority location to a previously assigned destination for the vehicle resource;

determining a priority environment penalty score for the vehicle resource based on the determined distance.

In accordance with some embodiments, systems, methods, apparatus, and computer-readable media for allocating networked vehicle resources provide for:

receiving a request to send a vehicle resource to a first location that is outside of a priority location;

identifying a first vehicle resource of a plurality of vehicle resources;

determining that the first vehicle resource is within an extended priority zone associated with the priority location;

determining a first distance from the first vehicle resource to the first location;

identifying a second vehicle resource of the plurality of vehicle resources;

determining that the second vehicle resource is outside the extended priority zone;

determining a second distance from the second vehicle resource to the first location, wherein the second distance is greater than the first distance; and selecting the second vehicle resource to allocate to the request.

According to a further aspect of the invention, systems, methods, apparatus, and computer-readable media provide for attracting vehicles (e.g., first responder vehicles, private hire vehicles) to fulfill requests (e.g., police dispatcher requests, customer bookings) in a hot spot area of relatively high demand for vehicles, the method comprising:

storing information relating to an active hot spot, the information identifying an area relating to the hot spot and information identifying an attraction distance to the hot spot;

automatically identifying that a request has a requested location (e.g., pickup location) that is outside the area identified as relating to the hot spot;

for each of plural vehicle resources that are capable of fulfilling the request, calculating a score in relation to the suitability of the vehicle to fulfill the request, wherein calculating a score comprises:
  calculating sub scores for each of plural factors and performing a mathematical operation on the sub scores,
  for each of the plural vehicle resources that are capable of fulfilling the request, determining whether the vehicle is located within the attraction distance of the hot spot, and
  for each vehicle determined as being located within the attraction distance of the hot spot, calculating a hot spot attraction penalty score and including the hot spot attraction penalty score in the mathematical operation to produce a score for the vehicle; and using the scores calculated for the plural vehicle resources to select a vehicle to allocate to the request; and allocating the selected vehicle to the request.

According to a further aspect of the invention, systems, methods, apparatus, and computer-readable media provide for attracting vehicles to fulfill requests with requested locations in a hot spot area of relatively high demand for vehicles, the method comprising:

storing information relating to a hot spot, the information including location information identifying a location relating to the hot spot;

automatically identifying that a location relating to a request meets a relationship requirement with respect to the location relating to the hot spot;

identifying plural vehicles that are capable of fulfilling the request;

calculating a hot spot attraction score for a first subset of the plural vehicles;

refraining from calculating a hot spot attraction score for a second subset of the plural vehicles, wherein the first subset does not overlap with the second subset;

using the hot spot attraction scores to calculate scores for the vehicles of the first subset in relation to the request;

calculating scores for the vehicles of the second subset of vehicles in relation to the request;

using the scores calculated for the plural vehicles to select a vehicle to allocate to the request; and allocating the selected vehicle to the request.

According to a further aspect of the invention, systems, methods, apparatus, and computer-readable media provide for attracting vehicles to fulfill requests (e.g., customer bookings) in a hot spot area of actual or expected demand for vehicles, the method comprising:

storing information relating to a hot spot, the information identifying a location relating to the hot spot and information identifying one or more vehicle types, the one or more vehicle types each indicating types of vehicles that are to be attracted to the hot spot;

automatically identifying that a request has a destination location (e.g., drop off location for a customer booking) that is at or near to the location relating to the hot spot;

identifying plural vehicles that are capable of fulfilling the request;

calculating a hot spot attraction score for a first subset of the plural vehicles, wherein the first subset of vehicles includes only vehicles associated with a vehicle type that matches a vehicle type included in the information relating to the hot spot;

refraining from calculating a hot spot attraction score for a second subset of the plural vehicles, wherein the first subset does not overlap with the second subset;

using the hot spot attraction scores to calculate scores for the vehicles of the first subset in relation to the request;

calculating scores for the vehicles of the second subset of vehicles in relation to the request;

using the scores calculated for the plural vehicles to select a vehicle to allocate to the request; and allocating the selected vehicle to the request.

Other aspects of the invention provide corresponding apparatus, computer programs, and computer readable media for performing any one or more of the methods of the present disclosure. Some embodiments comprise computer programs comprising machine readable instructions that when executed by computing apparatus causes it to perform any one or more of the described methods of allocating a vehicle resource to a future vehicle requirement. Some embodiments comprise a non-transitory computer-readable storage medium having stored thereon computer-readable code, which, when executed by computing apparatus, causes the computing apparatus to perform any one or more of the described methods of allocating a vehicle resource to a future vehicle requirement. Some embodiments comprise apparatus having at least one processor and at least one memory having computer-readable code stored thereon which when executed controls the at least one processor to allocate a vehicle resource to a future vehicle requirement by performing the steps of one or more of the described methods.

FIG. 1 is a schematic diagram of an example system for management of a plurality of vehicle resources according to various aspects of the present invention. As depicted in FIG. 1, example system 10 includes a number of interconnected components, as will now be described. The system 10 includes a vehicle resource allocation core system 12. This comprises one or more server computers running system software that ensures smooth operation of the system 10. In accordance with some embodiments, the vehicle resource allocation core system 12 may comprise one or more vehicle resource allocation controller devices. One or more of the represented components of the system 10 may be in communication with at least one other component using one or more communication networks, such as the example communications network 13.

Key functions of the system 10 include the allocation of vehicle resources from a plurality of vehicle resources (e.g., first responder vehicles, public or private security vehicles, military vehicles, private hire vehicles) to at least one requested particular location (e.g., a booking for a passenger pick up and drop off). As discussed further with respect to example system 100 (FIG. 8a and FIG. 8b), additional functions may include vehicle and driver management, account management, and/or record keeping.

The requesting function may be provided, in some embodiments, using one or more requester devices 20a-c in communication with one or more request servers 21 (e.g., a web-based request server, an application server, and/or a call centre terminal) in communication with the core system 12.

The allocation function is provided primarily by a vehicle resource allocation module 15, with information from other parts of the system 10.

In some embodiments, the priority location module 19 provides for one or more of: determining information about hot spots and other priority locations (e.g., by accessing priority location database 16), defining hot spots dynamically and/or in response to user input (e.g., hot spot definition information received using a user interface), and providing one or more user interfaces for receiving, transmitting, and managing information about hot spots (e.g., attraction distances, periodicity information).

In some embodiments, vehicle resource location monitoring (e.g., monitoring the locations of vehicles, associated vehicle resource devices, and/or drivers) is provided primarily by a vehicle resource location monitoring module 17, with reference, as necessary, to the vehicle resource database 14, vehicle resource devices 22a-c, and/or location service(s) 24, as well as other components of the system 100.

The system 10 may include one or more database functions, such as vehicle resource database 14, priority location database 16, and location database 18. The vehicle resource database 14 includes information about vehicle resources managed by the system 10. The priority location database 16 includes information about hot spots identified in the system 10, and may include information about extended priority zones associated with hot spots, attraction distances, and/or other types of parameters associated with defined hot spots. The locations database 18 may comprise maps and/or other types of information describing locations to which vehicle resources may be allocated (e.g., street addresses, GPS coordinates, points of interest information, etc.). Some additional or alternative types of databases that may be suitable for some desired embodiments are described further with respect to FIG. 8a and FIG. 8b.

The system 10 may further comprise one or more types of location service(s) 24, such as GPS systems and/or other types of device location services that may be useful for determining locations of any of requester devices 20a-c and/or of vehicle resource devices 22a-c. Each of vehicle resource devices 22a-c may be associated with a respective vehicle resource. A vehicle resource device may comprise a mobile computing device, smartphone, GPS component, and/or communications device configured to determine a location of a vehicle resource and/or to transmit information to the vehicle resource device about allocated tasks and destinations (e.g., transmitting an assigned destination to a vehicle's driver).

Figure 2:
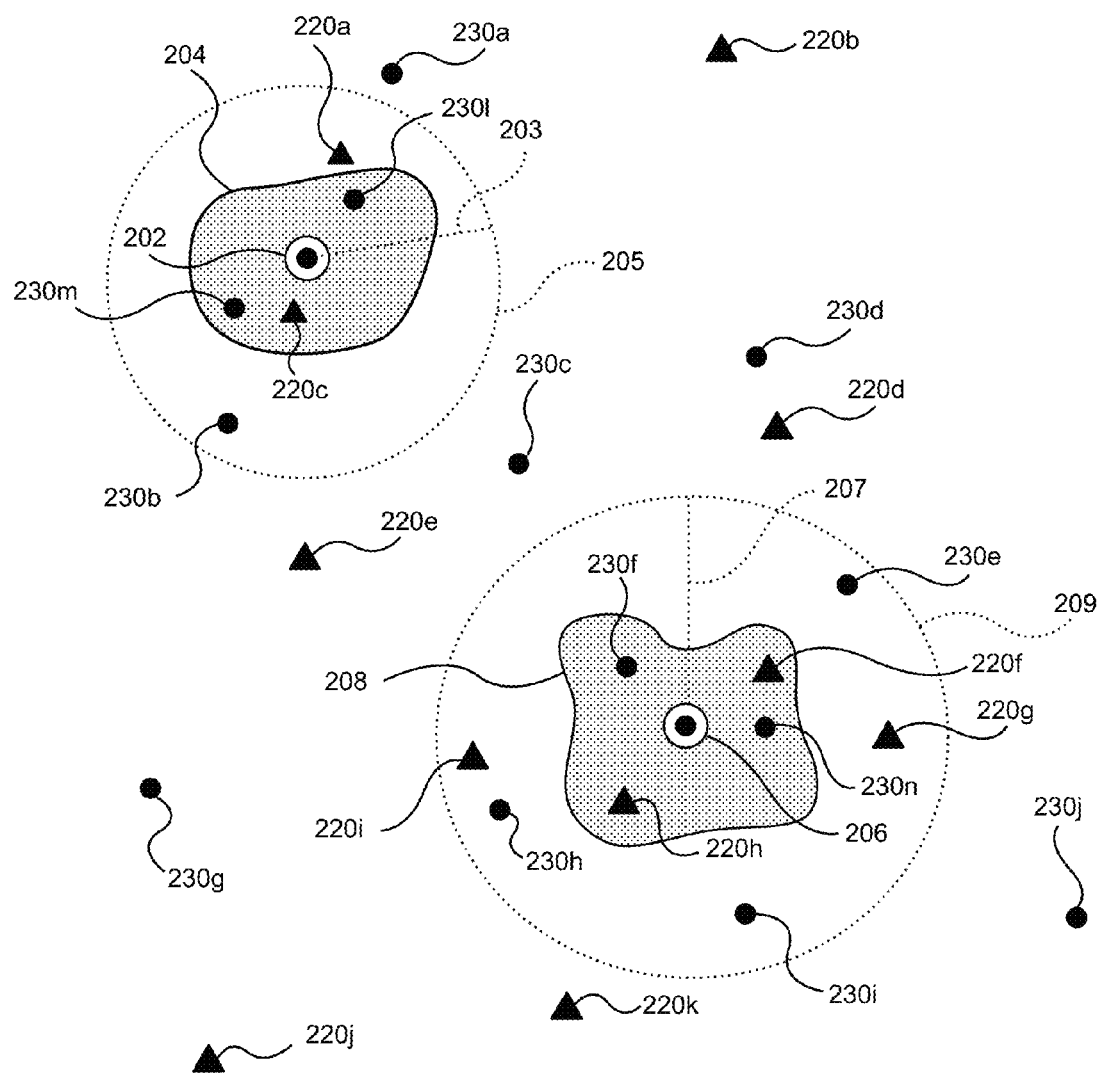
FIG. 2 is a schematic diagram of an example geographical area including a plurality of vehicle resources, locations to be serviced, and priority environments, according to various aspects of the present invention.

FIG. 2 is a schematic diagram of an example geographical area including a plurality of vehicle resources, locations to be serviced, and priority environments, according to various aspects of the present invention. The example geographical area includes hot spots 202 and 206. Each of the hot spots is associated with an area relating to the hot spot 204 and 208, respectively. In some embodiments, the hot spots 202 and 206 may be specific locations; in some embodiments, 'hot spot' may refer to the entire area related to the hot spot.

As depicted in FIG. 2, each of the hot spots 202 and 206 is associated with an extended priority zone 205 and 209, respectively. In the example, each extended priority zone 205 and 209 is defined by a respective priority radius or attraction distance 203 or 207.

In FIG. 2, the depicted example geographical area includes a plurality of represented vehicle resources 220a-k, and a plurality of particular locations 230a-n. The vehicle resources 22a-k may represent, for example, the current locations of vehicles managed by a vehicle resource allocation system. The particular locations 230a-n may represent, for example, locations of requesters (and/or potential requesters) and/or locations at which a vehicle resource is requested to be sent (e.g., an accident site for an ambulance, a drop off location for a passenger). As shown in FIG. 2, some vehicle resources may be within hot spots/areas related to hot spots, within extended priority zones but not within the associated hot spot, and outside extended priority zones (e.g., outside the attraction distance from a hot spot).

In some embodiments, a geographical area such as that depicted in FIG. 2 may be represented in one or more user interfaces (e.g., for visualizing locations of vehicles, requestors, and/or hot spots) for administering a vehicle resource allocation system.

Figure 3:
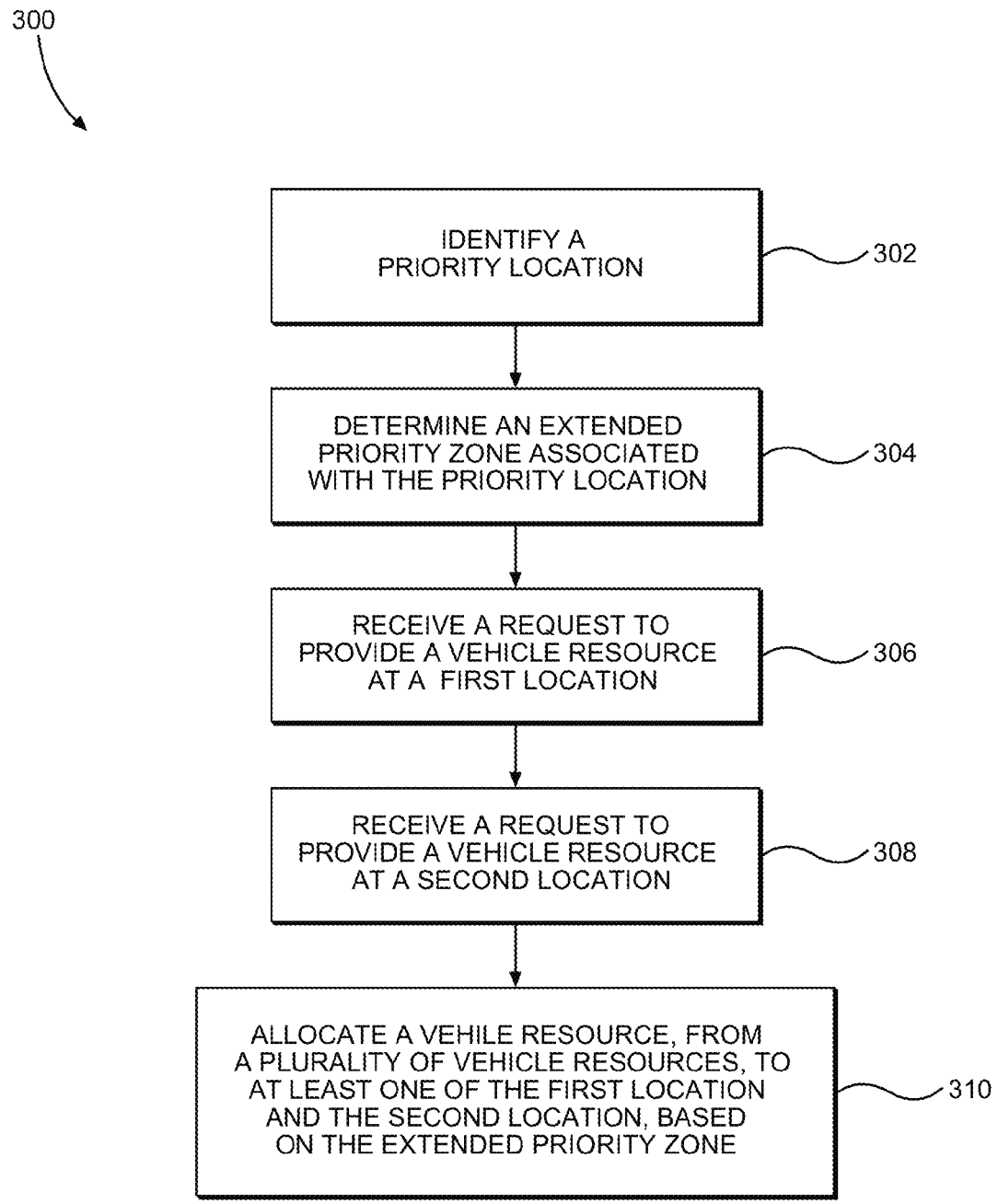
FIG. 3 is a flow chart illustrating an example operation of a system for allocating a vehicle resource based on an extended priority zone, according to various aspects of the present invention.

FIG. 3 is a flow chart illustrating an example method 300 for allocating a vehicle resource based on an extended priority zone, according to various aspects of the present invention. The method 300 may be performed, for example, by a server computer (e.g., a vehicle resource allocation controller device).

According to some embodiments, the method 300 may comprise identifying a priority location, at 302, and determining an extended priority zone associated with the priority location, at 304. Some examples of defining hot spots (and associated attraction distances) are described in this disclosure with respect to FIG. 10 and calculating hot spot attraction scores (at 1007).

In some embodiments, the method 300 may comprise receiving a request to provide a vehicle resource at a first location, at 306, and receiving a request to provide a vehicle resource at a second location, at 308. In one example, a request for a vehicle resource may be received by request server and/or a vehicle resource allocation system from a requester device (e.g., by a user using a smartphone application). Various types of requests for vehicle resources are described in this disclosure. In one example, receiving the requests may include a request for a vehicle resource to go to the first location and then to the second location, such as in a request to transport supplies or passengers from a pick up location to a delivery location, or for a search vehicle to visit the first location and then the second location in sequence. In another example, receiving the requests may include separate requests (e.g., by the same requester or by different requesters) for the respective locations.

According to some embodiments, the method 300 further comprises allocating a vehicle resource, from a plurality of vehicle resources, to at least one of the first location and the second location, based on the extended priority zone, at 310. Various examples of allocating vehicle resources based on information about attraction distance and other aspects of extended priority zones are discussed in this disclosure.

Figure 4:
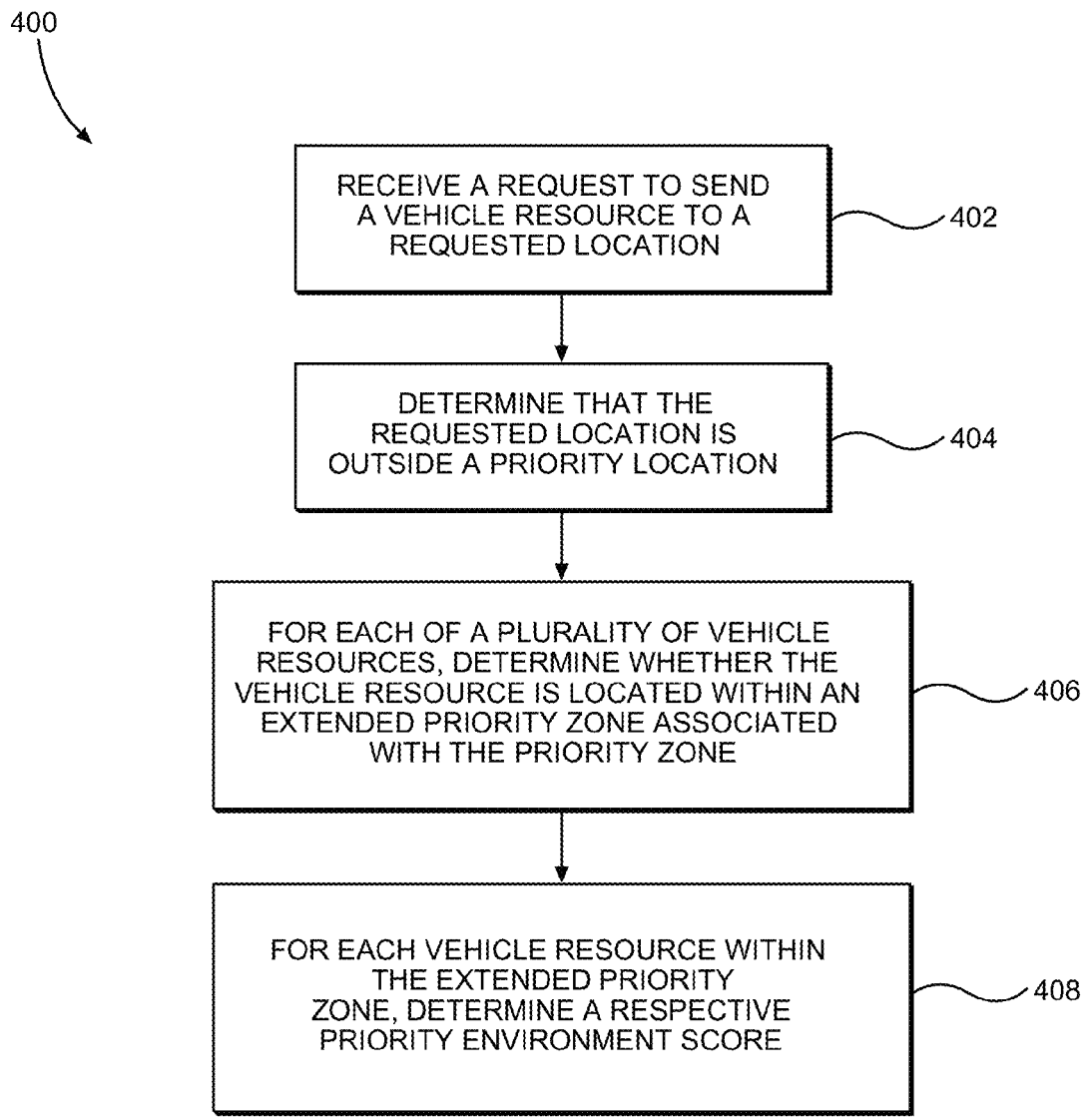
FIG. 4 is a flow chart illustrating an example operation of a system for management of a plurality of vehicle resources based on proximity to a priority location, according to various aspects of the present invention.

FIG. 4 is a flow chart illustrating an example method 400 for allocating a vehicle resource based on proximity to a priority location, according to various aspects of the present invention. The method 400 may be performed, for example, by a vehicle resource allocation controller device.

According to some embodiments, the method 400 may comprise receiving a request to send a vehicle resource to a requested location, at 402, and determining that the requested location is outside a priority location, at 404. In one example, a vehicle resource allocation system may receive a request to send a vehicle to a desired location that is not within the definition of a hot spot. The method 400 may further comprise, for each of a plurality of vehicle resources, determining whether the vehicle resource is located within an extended priority zone associated with the priority location, at 406. For example, as discussed in this disclosure, a vehicle allocation system may determine the current locations of all of the vehicles in its fleet, and determine that a vehicle is outside of a hot spot but within an attraction distance of the hot spot, or is otherwise within an extended priority zone defined and associated with the hot spot.

In some embodiments, the method 400 may further comprise, for each vehicle resource within the extended priority zone, determining a respective priority environment score, at 408. In one example, a priority environment score represents a downscore, or other weighted measure, for use in assessing the suitability of a given vehicle resource for a vehicle resource request (e.g., relative to other vehicle resources). As discussed in this disclosure, a priority environment score may comprise a penalty score (e.g., a hot spot attraction penalty score) for reducing the likelihood that a vehicle resource within an extended priority zone will be chosen over other vehicle resources (e.g., vehicles not currently in the extended priority zone). As also discussed in this disclosure, in some embodiments a penalty score based on an extended priority zone may be used (as a sub score) in combination with one or more other types of sub scores for determining a score (e.g., an aggregate or total score) for a vehicle resource.

Figure 5:
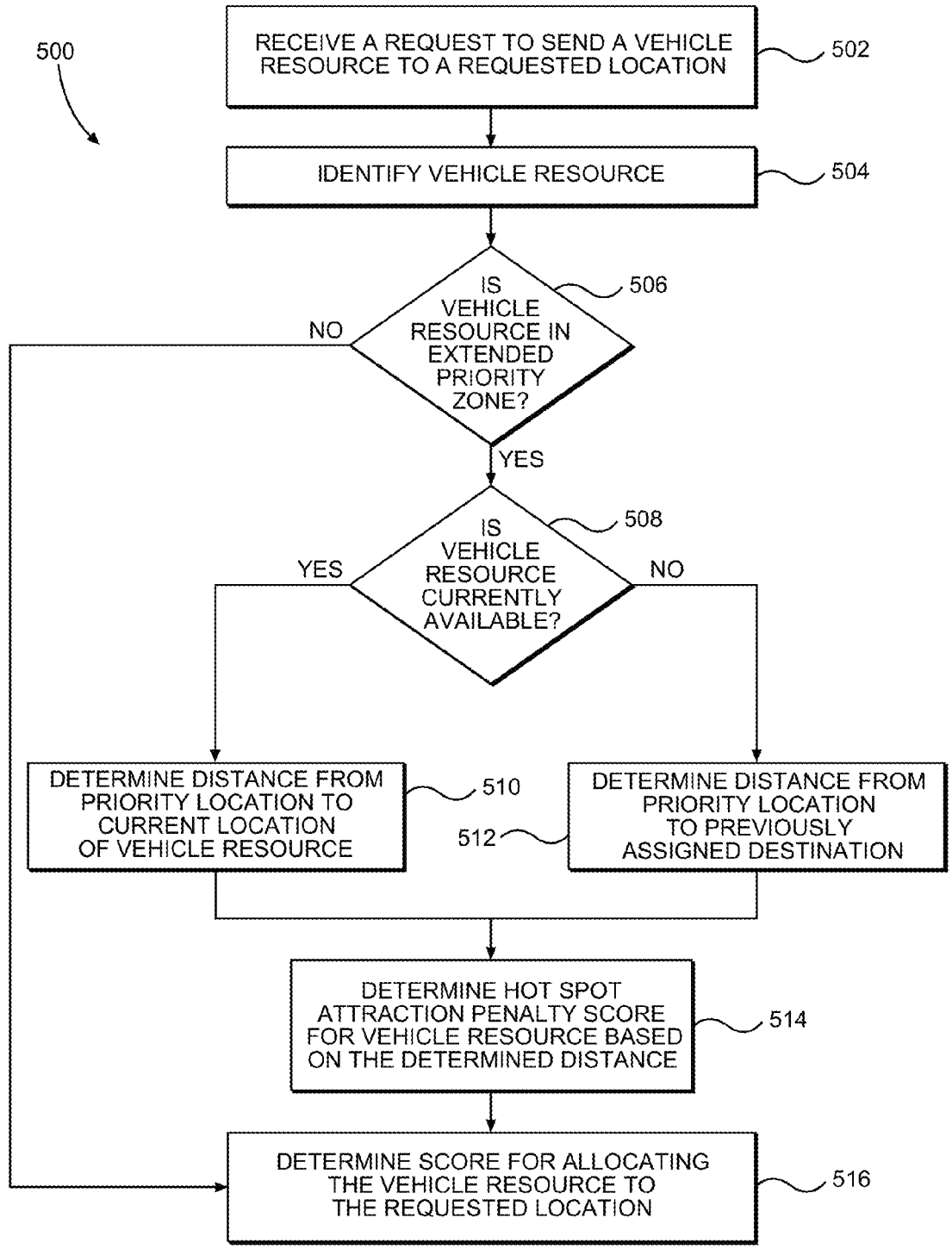
FIG. 5 is a flow chart illustrating an example operation of a system for management of a plurality of vehicle resources based on a priority location, according to various aspects of the present invention.

FIG. 5 is a flow chart illustrating an example method 500 for allocating a vehicle resource based on proximity to a priority location, according to various aspects of the present invention. The method 500 may be performed, for example, by a vehicle resource allocation controller device.

According to some embodiments, the method 500 may comprise receiving a request to send a vehicle resource to a requested location, at 502, identifying a vehicle resource, at 504, and determining whether the vehicle resource is in an extended priority zone, at 506. If the vehicle resource is in an extended priority zone, the method 500 may further comprise determining whether the vehicle resource is currently available (or is currently assigned to a location, or is otherwise unavailable), at 508. If the vehicle resource is not in an extended priority zone, the method may continue at 516, discussed further below.

In one or more embodiments, the method 500 may further comprise determining a distance associated with the vehicle resource. If it is determined (at 508) that the vehicle resource is currently available for allocation, the method 500 may comprise determining a distance from the priority location to a current location of the vehicle resource, at 500. Alternatively, if the vehicle resource is not currently available for allocation, the method 500 may comprise determining a distance from the priority location to a previously assigned destination for the vehicle resource, at 512.

The method 500 may further comprise determining, at 514, a hot spot attraction penalty score based on the distance determined at 510 or 512. The method 500 may further comprise determining a score for allocating the vehicle resource to the requested location (e.g., based on the hot spot attraction penalty score and at least one other sub score for the vehicle resource), at 516. Various formulas for determining hot spot attraction penalty scores and total or aggregate scores for vehicle resources are described in this disclosure.

Figure 6:
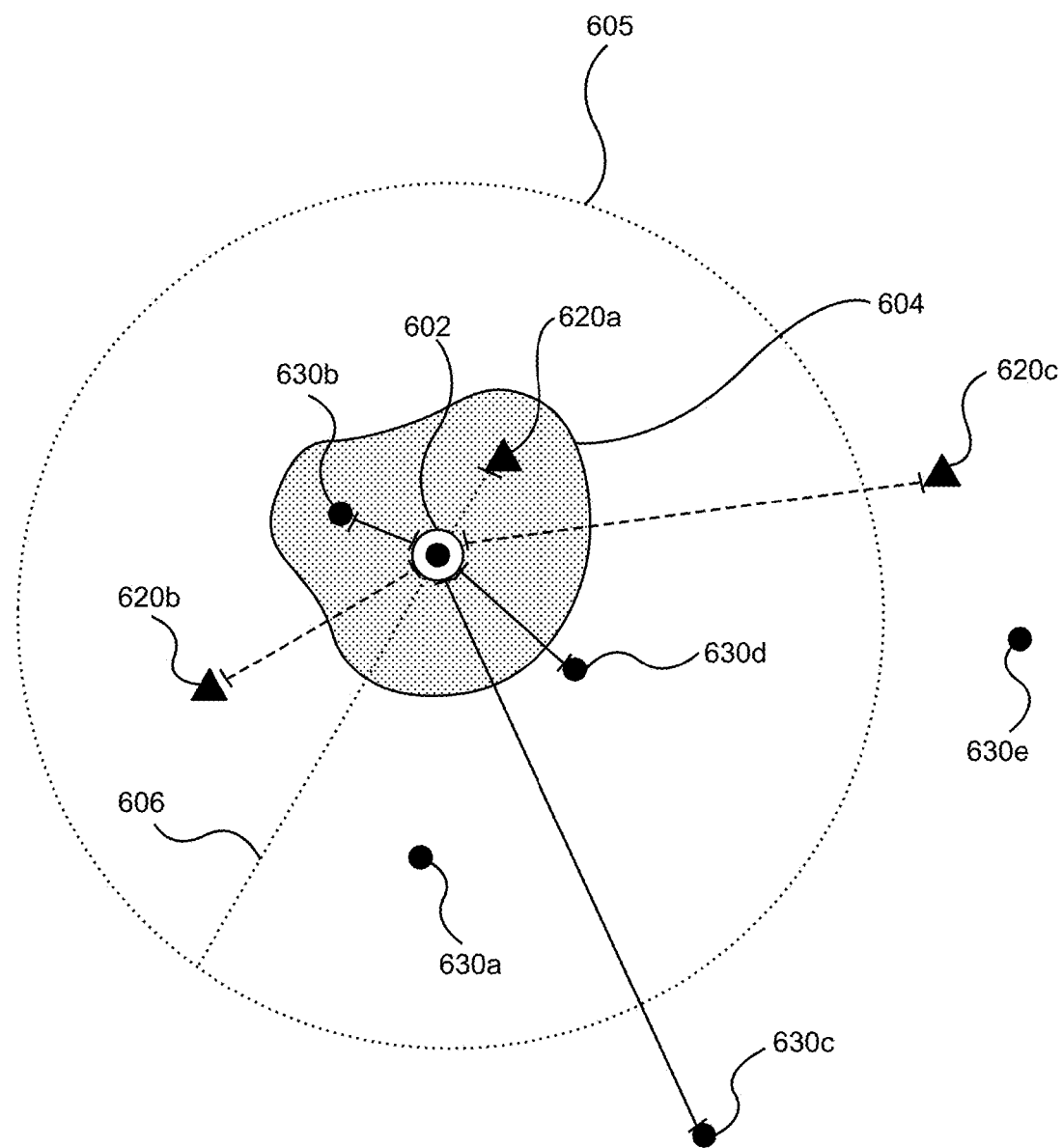
FIG. 6 is a schematic diagram of an example geographical area, including a plurality of vehicle resources and a priority environment, managed by a vehicle resource management system, according to various aspects of the present invention.

FIG. 6 is a schematic diagram of an example geographical area including a priority environment, according to various aspects of the present invention. The example geographical area includes a hot spot 602 with an associated area relating to the hot spot 604, and an extended priority zone 605 defined by the example attraction distance 606.

In FIG. 6, the depicted example geographical area includes a plurality of represented vehicle resources 620a-c, and a plurality of particular locations 630a-e. The vehicle resources 620a-c may represent, for example, the current locations of vehicles managed by a vehicle resource allocation system. The particular locations 630a-e may represent, for example, locations of requesters (and/or potential requesters) and/or locations at which a vehicle resource is requested to be sent.

In one example, a request for a passenger pick up at location 630a may be associated with a drop off location at 630e. Each of the represented vehicle resources 620a-c may then be assessed for assignment to the request. For instance, in accordance with some embodiments, even though 620*a* and 620*b* are closer to pick up location 630*a* than 620*c*, 620*a* and 620*b* are within the extended priority zone 605 around hot spot 602. Accordingly, a vehicle resource allocation system may penalize vehicles 620*a* and 620*b* when considering them for fulfilling the request (e.g., using a hot spot attraction penalty score as described with respect to FIG. 514), and select vehicle 620*c* to pick up the passenger even though those vehicles might be able to reach the pickup location 630*a* sooner. In this way, however, in accordance with some embodiments, the allocation system may improve the overall system efficiency and the availability and responsiveness of vehicles to requests, by maintaining more vehicles in the extended priority zone. By automatically maintaining more vehicles in the priority environment (without necessarily explicitly sending vehicles to the priority environment), overall travel times may be reduced by increasing the availability of vehicles for allocation to requests to and/or from the hot spot and nearby areas.

In some embodiments, a geographical area such as that depicted in FIG. 6 may be represented in one or more user interfaces (e.g., for visualizing locations of vehicles, requestors, and/or hot spots) for administering a vehicle resource allocation system.

Figure 7:
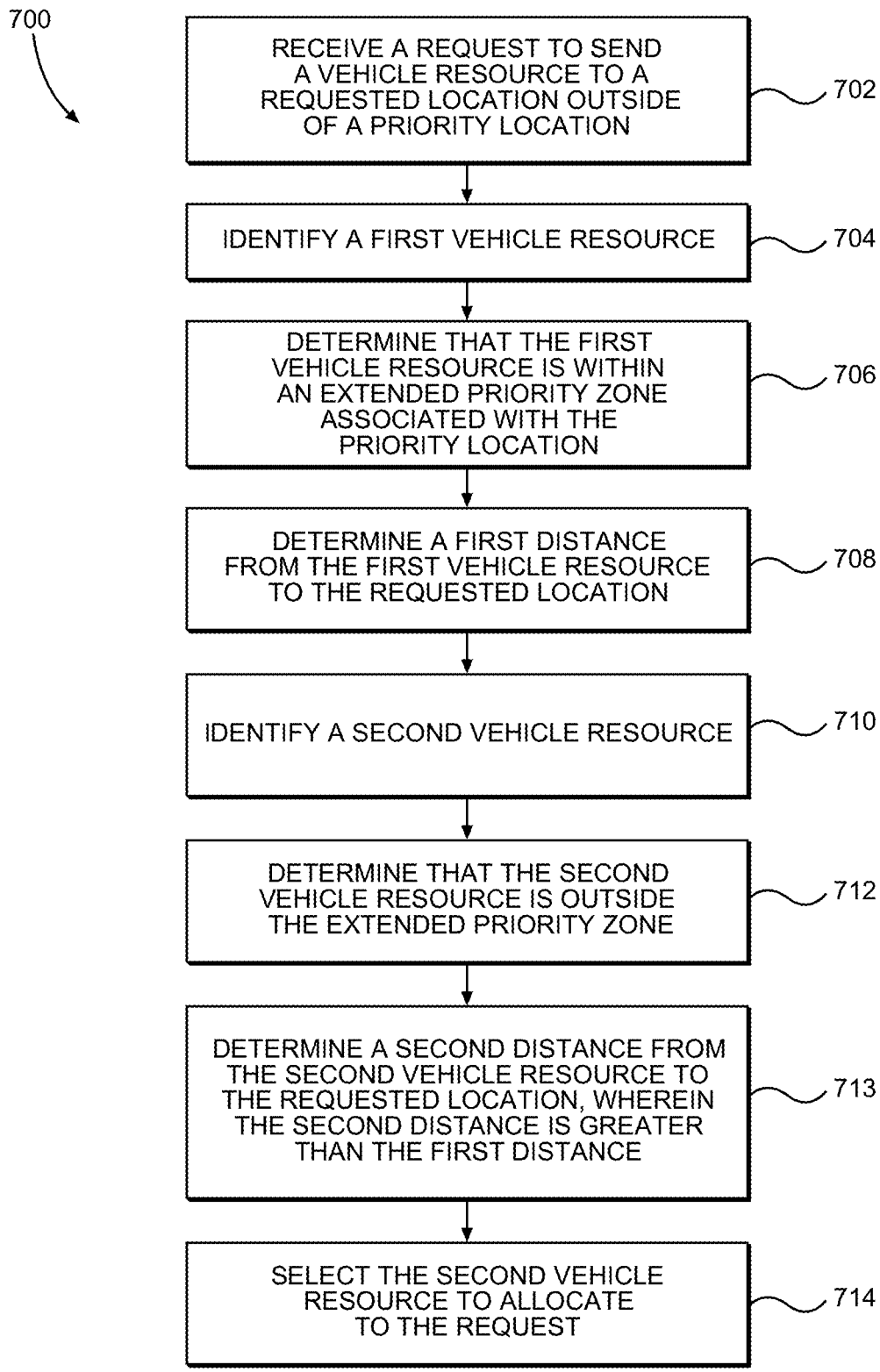
FIG. 7 is a flow chart illustrating an example operation of a system for management of a plurality of vehicle resources, according to various aspects of the present invention.

FIG. 7 is a flow chart illustrating an example method 700 for allocating a vehicle resource based on proximity to a priority location, according to various aspects of the present invention. The method 700 may be performed, for example, by a vehicle resource allocation controller device. As discussed above with respect to FIG. 6, in some instances, a vehicle resource allocation system may provide for selecting a particular vehicle resource to allocate to a vehicle request, even if another vehicle may be closer at the time of the request, in order to efficiently maintain vehicle resources within an extended priority zone, hot spot, or priority environment.

According to some embodiments, the method 700 may comprise receiving a request to send a vehicle resource to a requested location outside of a priority location, at 702, identifying a first vehicle resource (e.g., of a plurality of vehicle resources), at 704, and determining that the first vehicle resource is within an extended priority zone associated with the priority location, at 706. The method 700 further comprises, in some embodiments, determining a first distance from the first vehicle resource to the requested location, at 708.

In some embodiments, the method 700 may further comprise identifying a second vehicle resource (e.g., of the plurality of vehicle resources), at 710, determining that the second vehicle resource is outside the extended priority zone, at 712, and determining a second distance from the second vehicle resource to the requested location, wherein the second distance is greater than the first distance, at 713. The method 700 may further comprise, in accordance with one or more embodiments, selecting the second vehicle resource (the one farther away from the requested location) to allocate to the request, at 714.

As discussed above, various types of vehicle resource allocation systems may provide for allocating different types of vehicles (e.g., first responders, remotely-operated aircraft) based on priority environments, and may efficiently attract vehicles to hot locations and/or related extended priority zones without specifically sending vehicles to a hot spot. FIGS. 8*a*, 8*b*, 9, 10, and 11 and the accompanying text below describe some additional details of managing vehicle resources with respect to hot spots, using an example and non-limiting context of a private hire vehicle service.

Figure 8A:
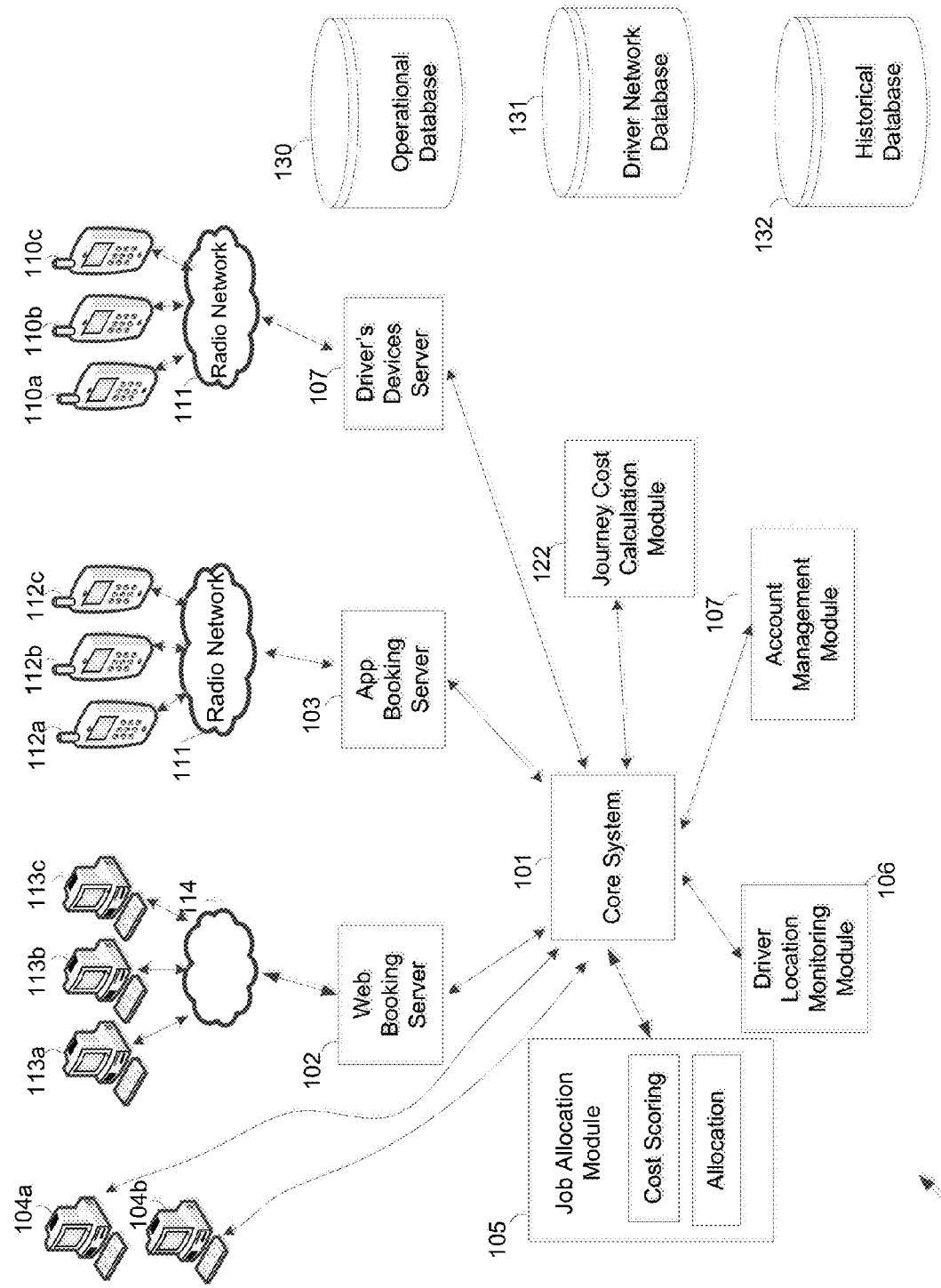
FIG. 8a is a schematic diagram of a system for management of a private hire vehicle service according to various aspects of the present invention.

FIG. 8*a* is a schematic diagram of a system for management of a private hire vehicle service according to various aspects of the present invention.

The system 100 includes a number of interconnected components, as will now be described. The system 100 includes at its centre a core system 101. This comprises one or more server computers running system software that ensures smooth operation of the system 100.

Key functions of the system 100 are bookings, allocation of a private hire vehicle to a booking, vehicle and driver management, account management and record keeping.

The booking function is provided primarily by a web booking server 102, an application booking server 103 and call centre terminals 104A and 104B, all of which are coupled to the core system 101.

The allocation function is provided primarily by a job allocation module 105, with information from other parts of the system 100.

The system includes database functions. In particular, an operational database 130 stores records that relate to general operation of the system 100. A driver network database 131 stores records that relate to drivers and vehicles that are managed by the system 100. Lastly, a historical database 132 stores records that have been archived from the operational database 130. Archiving of records from the operational database 130 to the historical database 132 occurs periodically and only records that are no longer needed for general operational use are archived.

The vehicle and driver management function is provided primarily by a driver location monitoring module 106 and a driver's devices server 107, with reference to the driver network database 131 as well as other components of the system 100.

The account management function is provided primarily by an account management module 117, utilizing accounts information stored in the operational database 130 along with other components of the system 100.

The operational database 130 stores details of every account held with the operator of the system 100. Each account is identified by an account number stored in the operational database 130. The accounts information stored in the operational database 130 may also include an account name, such as a company name and contact details for the company. The accounts information stored in the operational database 130 stores credit card details and/or other payment details so that payment can be taken from the account holder if permitted. A password and/or PIN (personal identification number) is associated with each account and stored with the accounts information in the operational database 130. Furthermore, a list of persons authorized to make bookings on the account may be stored, and optionally profiles for the individual authorized persons within the accounts.

The accounts information stored in the operational database 130 may also include a contact name and telephone number of a person who should be contacted in case of problems with the account. The accounts information stored in the operational database 130 includes information regarding invoicing preferences, for example the frequency of invoicing, date on which the invoice should be sent, the monthly/weekly credit limit and what information from each booking should be included on the invoice. The accounts information stored in the operational database 130 may indicate whether each account is active, or if it has been placed on hold. An account may be placed on hold by a credit control department and this may prevent further bookings being made on the account. Historical data of spending on the account may also be stored in the operational database 130, or this may be stored in the historical database 132.

The record keeping function is provided primarily by the historical database 132, although the operational database 130 and the driver network database 131 also provide some record keeping function.

In brief, a fleet of private hire vehicles is managed by the system 100. Each vehicle has a respective record in the driver network database 131, as will now be described.

The driver network database 131 stores information about every vehicle in the fleet. The registration number (license plate number) of each vehicle is stored in the driver network database 131. This may be used to identify each vehicle. Alternatively or in addition, a unique identifier separate from the registration number may be assigned to each vehicle as the primary means of identification within the driver network database 131.

Each Service is defined according to its vehicle type, capacity and other characteristics. In some embodiments, these types are "Up to 4 passengers", "Up to 7 passengers", "Electric vehicle", "VIP" and "Up to 4 passengers with luggage". The driver network database 131 stores the type of each vehicle and may also store a corresponding number or short string of characters which represents each type. Any special equipment such as a baby seat or the ability to accommodate a wheelchair is also identified in the driver network database 131. The driver network database 131 indicates the current driver to whom the car is assigned, although the driver/vehicle allocation changes from time to time.

The driver network database 131 stores the make and model and optionally the color of each vehicle. The driver network database 131 also indicates the current status of the vehicle. In some embodiments, the status is chosen from "Driv—er Pool", meaning that the car is in use by a driver, "Free Pool", meaning that the car is not currently being used and is free to be allocated to a driver and "Workshop", meaning that the car is undergoing maintenance or repair. The driver network database 131 also stores the private hire license number (PCO) for each vehicle and the date on which this license expires as well as the road tax, vehicle insurance and MOT (vehicle roadworthiness certificate) expiry dates if appropriate. Examples of other data which may be stored are the date of purchase of the vehicle, the price paid for the vehicle, the date of manufacture, the supplier of the vehicle, warranty information and the date of the last inspection/maintenance.

Historic data about each vehicle may also be stored in the driver network database 131, such as a record of the previous registration numbers and a record of the previous drivers who were assigned to the vehicle. The service history and details of any accidents and repairs may also be stored.

The fleet of private hire vehicles is driven by a pool of drivers, each of which has a record in the driver network database 131.

The driver network database 131 stores information about each of the drivers registered with the operator of the system 100. The information relating to drivers includes personal data such as name, contact details (including phone number, home address), date of birth, next of kin and driver account data. Driver status information may be stored to indicate whether a driver is active or inactive, whether the driver has been allocated a vehicle etc. Each driver may also be assigned an individual and unique identifier as a means of identifying the driver. Callsigns may also be used to denote drivers and are stored in the driver network database 131, although callsigns can be changed and reallocated between drivers as long as the same callsign is not in use by two drivers at the same time.

Driver account data includes an account number. Other information may include a driver's insurance details, a driver's length of service in the fleet, details of parking fines, historical wage information, holiday leave, driver diary information, information regarding payment collections from drivers, driver's license number, national insurance (social security) number, details relating to a driver's taxicab license (such as Public Carriage Office (PCO) license), driver banking details (account number, sort code etc.). Miscellaneous information such as details of any allergies, smoker/non-smoker etc. may also be stored in the driver network database 131. Information regarding driver equipment such as a serial number of the driver's device 110 allocated to the driver, and mobile phone number of their driver's device 110 and their private mobile phone may also be recorded. Statistical information such as date of last job or historical earnings data may be recorded in the driver network database 131, or this may be recorded in the historical database 132.

Information relating to payments to and from drivers may be stored in the driver network database 131. Payments to the driver include a driver's wages. Driver outgoings may include, for example, car wash charges, insurance premiums, PCO renewal fee, accident costs, vehicle rental. To assist in maintaining this information, a purchase ledger number and contract number relating to each driver may be stored.

Each driver has an associated driver's device 110, three of which are shown at 110A, 110B and 110C in the Figure. The driver's devices 110 are portable electronic devices that are provided with wireless communication facilities. The driver's devices no may take any suitable form, but typically are smart phones or personal digital assistants or such like. The driver's devices 110 include a display and one or more input devices such as a keyboard, a voice control module or a touch screen or any combination thereof.

The driver's devices 110 are connected to the driver's devices server 107 via radio network 111, which may for instance be a mobile phone (cellular phone) network. In this case, the driver's devices 110 are provided with subscriptions to the mobile phone network such that they can send digital data to and from the driver's devices server 107. Additionally, messages are able to be passed between the driver's devices 110 and the driver's devices server 107 through other media, and in particular SMS (short message service) messages and optionally also MMS (multimedia message service) messages.

The radio network 111 may alternatively be a dedicated radio network, for instance a private mobile phone network or a private radio network of some other type.

Data may be communicated between the driver's devices 110 and driver's devices server 107 over any suitable communications link, for instance using a data channel of a cellular telephone network such as a GSM, EDGE, GPRS, UMTS, HSxPA or LTE network.

The driver's devices 110 are configured to report their locations to the driver network database 131 at regular intervals, for instance 30 second intervals. The driver's devices 110 include GPS (global positioning system) receivers, which calculate the locations of the driver's devices 110 under control of the software applications executing on the driver's devices 110. Alternatively, they may include some other positioning module or device that is operable to calculate the positions of the driver's devices 110 with a suitable level of accuracy and resolution.

A private hire vehicle may be booked by a customer in one of three ways. Firstly, a private hire vehicle may be booked in a telephone conversation with a call centre operator. In this case, the customer initiates a telephone call with a call centre, an agent of which operates one of the call centre computer terminals 104A and 104B. The call centre agent then operates the terminal 104A, 104B so as to make the booking of the private hire vehicle according to the customer's requirements. The customer's requirements are obtained verbally during the telephone conversation between the customer and the agent.

In the second option, the customer may make the private hire vehicle booking using a browser application on a computing device 113, three examples of which are shown at 113A, 113B and 113C in the Figure. Each of the computing devices 113 is connected to the web booking server 102 by a network 114, which may for instance be the Internet or another public or private network. The web booking server 102 includes web server functionality that causes display of suitable web pages by the browser of the terminal 113. The customer's requirements with respect to the private hire vehicle booking are obtained by the web booking server 102 through the provision of suitable pages to the computer terminal 113 requesting the provision of the required information by the customer. The information may be provided by the customer through free text entry through the use of drop down lists, radio buttons etc. Some information may be pre-filled into the web pages provided by the web booking server 102.

Booking through the web booking server 102 may require the customer to login to a web portal before they can make their booking. The logging in may require the entering of a username and a password or PIN number. Through the control of a web session by the web booking server 102, for instance using cookies provided to the computer terminals 113, the booking can be known to have been validly made by virtue of the customer having being logged in to the web booking server at the time the booking was made.

The final way in which a customer can make a booking of a private hire vehicle is using a dedicated software application that is installed on and running on a portable communications device 112, three of which are shown at 112A, 112B and 112C in FIG. 8a. The portable communications devices 112 may take any suitable form, but typically are smart phones, feature phones, tablet computers or personal digital assistants or such like. The communication devices 112 are coupled to the application booking server 103 by a radio network in, which may be the same as the radio network in described above with relation to the driver's devices 110 and the driver's devices 107.

The application is configured to provide a user interface that allows the customer to provide the software application with the information required to make the private hire vehicle booking. For instance, the software application, when executed, may cause the display of interactive pages that allow the customer to select or enter the required information. The software application is configured also to communicate the information relating to the booking that has been provided by the customer to the application booking server 103. If based on information provided by the customer it is determined that the application booking server 103 requires additional information, the software application running the mobile device 112 is configured to provide an interactive display to the customer such that the customer can provide the information, following which the software application causes it to be provided to the application booking server 103.

The customer may be required to log in to the software application on the mobile device 112, prior to making a booking. Logging in to the software application may require a username and a password or PIN number. Alternatively, the username may be entered during set up of the application and may not need to be entered subsequently when this software application is executed. If the username is not required to be entered, the user may log in to the software application simply by entering the password or PIN number.

The information about the private hire vehicle booking that is obtained during the booking process is as follows.

Customer details. The customer details may be the name of the customer or an identifier that uniquely identifies the customer within the operational database 130.

Service type. This indicates the category of vehicle. For instance, the service type may indicate a vehicle of a standard type and having four seats, or a vehicle of a standard type and having seven seats. The service may alternatively indicate a VIP vehicle, or an environmentally-friendly (electric or hybrid) vehicle (also known as a green vehicle).

Journey type. The journey type may be a single (one-way) trip, or it may be a wait and return trip. The journey type may alternatively be a journey including multiple pick-up locations or multiple drop off locations or both multiple pick-ups and multiple drop off locations. The journey type may alternatively indicate that it is a pick-up from an airport or a drop at an airport.

Pick-up address. This indicates an address at which the customer is to be picked up at the beginning of the journey. The address is a natural language address. The address is selected from one of the plurality of addresses stored in a database. The addresses may be stored in the operational database 130 or the historical database 132, or they may be provided by an external address database service, for instance geo.me or qas-.co.uk. The addresses each have associated therewith a verified coordinate location expressed in latitude and longitude. Multiple databases may be used (in a hierarchical fashion) for address lookup. The pick-up address may be selected by the customer in any suitable way, with the most appropriate way depending on whether the customer is using the software application on their mobile device, using the web booking service or using an agent in a call centre. If the journey type is an airport pick-up type, the pick-up address indicates the airport and terminal and optionally flight number.

Drop off address. The drop off address again is selected from one of multiple addresses stored in the database and is selected by the customer in any suitable way. If the journey type is an airport drop off type, the pick-up address indicates the airport and terminal and optionally flight number.

Pick-up date and time. This indicates a time and date which the customer requires the journey to start. Alternatively, the date and time may indicate ASAP (as soon as possible), if the customer requires the private hire vehicle at the earliest opportunity.

Optional information regarding the booking includes the following.

Customer's reference. This can be provided for instance as free text or selected from a drop-down menu. If a reference is provided, this information can be included in an account statement against a journey at a later date.

Additional comments. This is free text that provides any potentially relevant information, and may be provided to the driver once the booking has been allocated.

The system 100 comprises a journey cost calculation module 122. The cost calculation module 122 executes software code which determines the price for a requested journey, during the booking process and prior to vehicle allocation. Journey cost calculation is performed at the time of a booking and the result returned to the customer requesting the booking. The resulting cost for the journey is provided before the customer confirms the booking.

The journey cost calculation module 122 uses a number of different ways of calculating the base cost of the journey. The module 122 may set a fixed price for some journeys. These are agreed in advance with a particular account customer for journeys between pre-determined points. The cost calculation module 122 checks whether the booked journey and customer meet the requirements for a fixed price tariff. If the conditions are not met, then another pricing method is used. The cost calculation module 122 may use zonal pricing if a fixed price is not used. Where every point on the journey is within a defined zone, zonal pricing can be used. If neither fixed pricing nor zonal pricing is used, or if the conditions for their application are not met, then the cost calculation module 122 may use an A to B (A-B) pricing method. The A-B method may specify the number of units between points A and B. A unit price depending on the type of vehicle etc. is then used to calculate the price. If there is no A-B record for a particular journey, the crow fly (direct) distance (i.e. the length of a straight line between the pick-up and drop-off locations) is used to calculate the base cost for the journey. This method may use map grid references or alternatively may be based on GPS data, i.e. the latitude and longitude of the pick-up and drop-off points.

The cost calculation module 122 may retrieve all the map and location information needed to make these calculations from the historical database 132. The historical database 132 may store a detailed geospatial model of a particular region, such as a city. As an alternative, or in addition to the methods described above, the cost calculation module 122 may use the real road distance for the journey, which is calculated using the road map from the historical database 132 and a route planning algorithm. Different rates may be used for different parts of a single journey. For example a first per mile rate may be used for the first 10 miles of a journey and a second per mile rate may be used for the rest of the journey. The historical database 132 may also store information regarding speed limits and historical traffic data. This information may also be used by the cost calculation module 122 to calculate an estimated time for the journey. The estimated journey time may then form the basis of the cost calculation.

Other criteria used by the cost calculation module 122 when calculating the price are the type of vehicle (VIP, green, 7-seater etc.) including any special facilities the vehicle has, the method of payment and the date and time of the journey. The cost calculation module 122 may also apply a flat "pick-up fee" for every journey.

The cost calculation module 122 may also determine how much of the fare charged to the customer is passed to the driver. This may be a simple percentage of the total fare or a more complex calculation based on one or more of journey time, distance, waiting time and number of passengers.

The allocation function allocates a vehicle and driver to a booking. The allocation function is described in some detail below. In brief, a vehicle and driver are allocated to the booking, and the associated customer, having regard to a number of factors including the pick-up location specified in the booking, the drop off location specified in the booking, the service type specified in the booking, the date and time specified in the booking, the geographical distribution of the vehicles that are managed by the system 100, the demand for vehicles that are managed by the system 100 and information relating to the drivers.

The allocation function is automatic insofar as it does not require any manual involvement once the booking has been made. Once a job has been allocated to a particular driver and a particular vehicle, this is recorded in the operational database 130 with an indication that the journey has not yet been travelled.

The vehicle and driver management function includes a number of features. These include the monitoring of vehicle in terms of distance travelled etc. and ensuring that they provided for mechanical servicing at appropriate times. Drivers are managed also to ensure that documentation relating to private hire vehicle licenses, insurance etc. is in place. Additionally, the function maintains a record of hours worked and jobs performed, along with any other relevant information.

The accounts management function acts to manage information relating to customer's accounts with the operator of the system 100. This includes the maintenance and management of information such as authorized users, credit limits, invoicing requirement etc.

The record keeping function acts to store various information that is created by or observed by the system 100. This information includes information about bookings yet to be fulfilled, which is included in the operational database 130.

Figure 9:
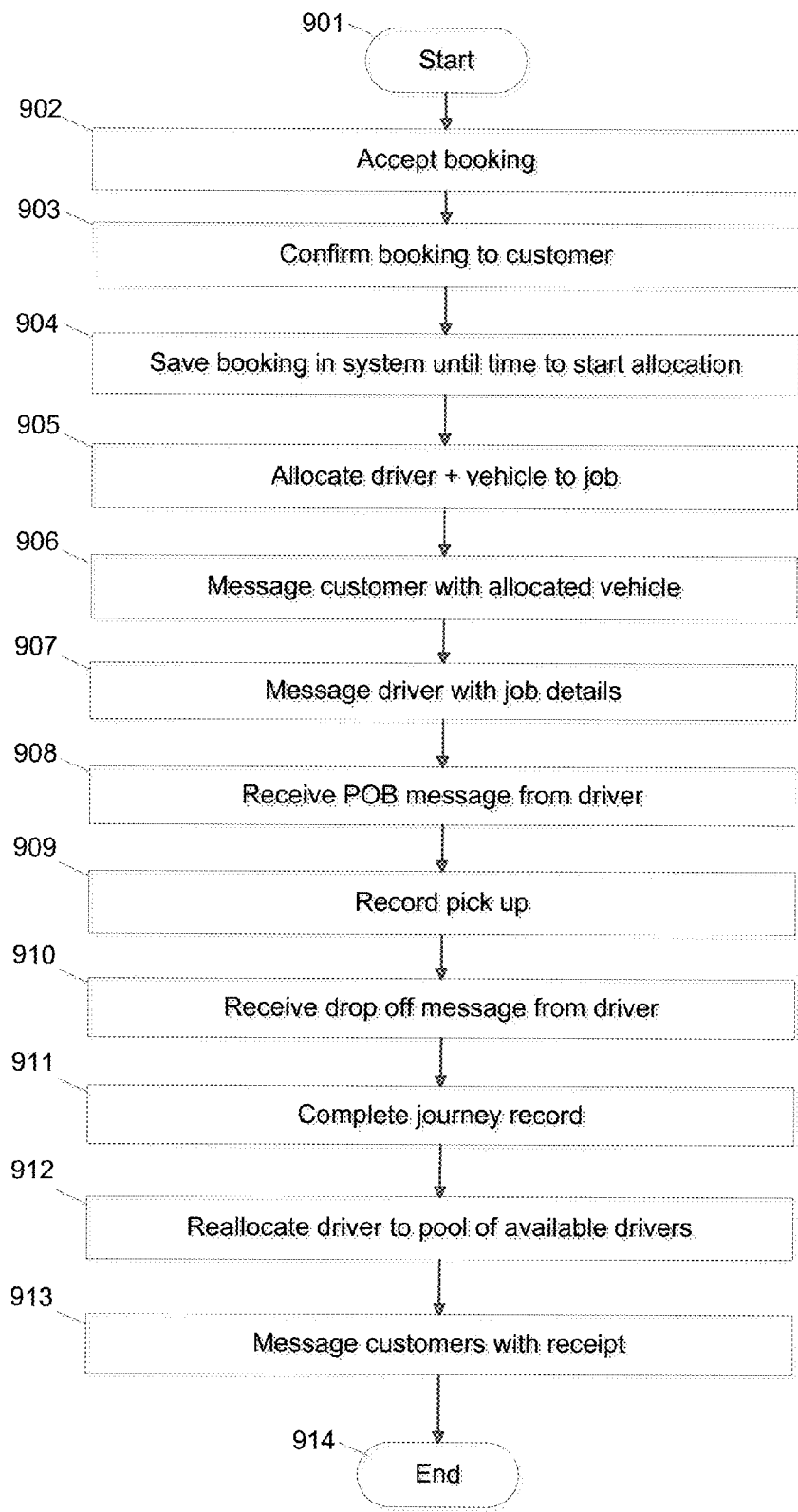
FIG. 9 is a flow chart illustrating overall operation of the system in fulfilling a booking through providing a private hire vehicle, and is performed by the system of FIG. 8a or the system of FIG. 8b.

The sequence of steps that are performed by the system during execution of a job will now be described with reference to FIG. 9. This shows execution of a relatively simple job in which there is one pick-up location, one drop off location, no driver reallocation and no variation in the journey. Additionally, journey costing and invoicing are not covered by this Figure.

The operation starts at step 901. At step 902, a booking is accepted by the system 100. Alternative ways for accepting a booking are described above with reference to FIG. 8*a*.

At step 903, the booking is confirmed to the customer, for instance by email. The message sent to the customer by the system 100 includes a booking reference number and some or all of the information relating to the booking, including the pick-up and drop off locations, the date and time of pick-up etc.

At step 904, the system 100 saves the booking until it is time to start allocation. For an ASAP job, allocation may commence straight away. Otherwise, allocation may start a fixed time before the date and time specified for pick-up in the booking information, as is described in more detail below.

At step 905, the system allocates a driver and a vehicle to the job. This is discussed in relation to FIG. 10 and FIG. 11 below. On allocating the vehicle, the status of the vehicle and driver is changed from "Available" to "Allocated". This prevents the vehicle/driver being allocated to a different job until the status changes to a suitable status.

At step 906, the system 100 sends a message to the customer with details of the allocated vehicle. The message includes text such as 'Your vehicle is on its way'. The message also indicates the job number, which may be the same as the booking number. The message also indicates the identity of the vehicle, so that it can be readily identified by the customer. The identity of the vehicle may be indicated for instance by the registration or license plate that is provided on the vehicle. It may also indicate the make and model of the vehicle, and/or the color of the vehicle.

Additionally, the message includes information by which the customer can contact the driver that has been allocated to the job. For instance, it may include the mobile telephone number of the driver. Providing the mobile telephone number of the driver allows the customer to call the driver with any comments or questions that they may have before the customer is collected by the vehicle. Additionally, the message includes a hyperlink to a webpage at which the location of the vehicle is shown on a map. This allows the customer to identify where the vehicle is at any stage between the vehicle being allocated to the job and the customer being collected by the vehicle.

At step 907, the system 100 sends a message to the driver with details of the job. The message includes various pieces of information including the name of the customer. This allows the driver to confirm the customer when the driver meets the customer at the pick-up location. The message also includes the pick-up location and the drop off location. The pick-up location and drop off location may be provided in the message in such a way that they can be extracted by the driver's device no and automatically placed into a navigation application that is present on the driver's device 110. This allows the driver to commence the provision by the driver's device 110 of navigation guidance to the pick-up location in response to the driver selecting the pick-up location by way of an input on the driver's device 110. Similarly, after the customer has been collected at the pick-up location, the driver can cause the device 110 to commence providing route guidance to the drop off location by providing a suitable input on the driver's device 110.

The system may comprise a route planning module configured to run a route planning algorithm. The route planning module may access the map and location database 109 in order to calculate a route. The route planning module may also access historical traffic data in the historical database 132 and/or live traffic information in order to more accurately predict the fastest route. Once a driver has indicated that they have picked up a customer, the route planning module may provide route guidance to the driver via the driver's device 110. The route guidance may be in the form of navigation instructions. Having a centralised route planning and guidance providing system avoids the need for the driver to provide their own route guidance device and to keep such a device updated.

At step 908, the system 100 receives a POB (passenger on board) message from the driver. This message is transmitted by the driver's device no in response to the driver indicating that they have collected the customer from the pick-up location. The option to indicate POB status is provided to the driver once the driver device 110 determines that the vehicle has arrived at the pick-up location, or is within a predetermined radius (e.g. 50 m) of the pick-up location and has become stationary. However, the sending of the POB message from the driver's device 110 is not automatic. In this step, the status of the vehicle/driver is changed from "Allocated" to "POB".

Following receiving the POB message from the driver, the system 100 at step 909 records that the customer has been picked up. Next, the system 100 receives a drop off message from the driver at step 910. This is message is sent by the device 110 after the driver indicates to the driver's device 110 that the customer has been deposited at the drop off location. The option to indicate that the customer has been dropped off may be provided to the driver upon the driver's device no determining that the vehicle has reached the drop off location or is within a predetermined radius (e.g. 50 m) of the drop off location and has become stationary. However, the sending of the drop off message from the driver's device 110 is not automatic.

After the drop off message has been received from the driver's device 110 at step 911, the system 100 completes a journey record for the journey in the operational database 130 (the record was created during the booking process). The record of the journey stored in the operational database 130 includes the following information. The record includes the pick-up address and the drop off address. The information also includes the pick-up time and date and, if different, the booking time and date. The record also includes the drop off time and date, as detected by the system 100 in response to receiving the drop off message from the driver at step 910. The record also includes the cost of the journey, in terms of financial value.

The record also includes the travelled distance, which is not the crow fly (direct) distance between the pick-up and drop off locations but instead is the road distance travelled by the vehicle. The record also includes the journey time, in terms of minutes and seconds. The record also includes vehicle type information that indicates the type of vehicle that performs the journey.

The record also includes the booking information relating to the journey, which may include information about the identity of the customer that made the booking, the time of making the booking, the mode of making the booking (e.g. web, application or call centre) and any other relevant information relating to the booking.

Next, at step 912 the driver and vehicle are reallocated to the pool of available drivers. This is achieved by changing the status of the vehicle/driver to "Available" from "POB".

The customer is then messaged with a receipt for the journey travelled, if required, at step 913. Lastly, the operation ends at step 914.

Figure 10:
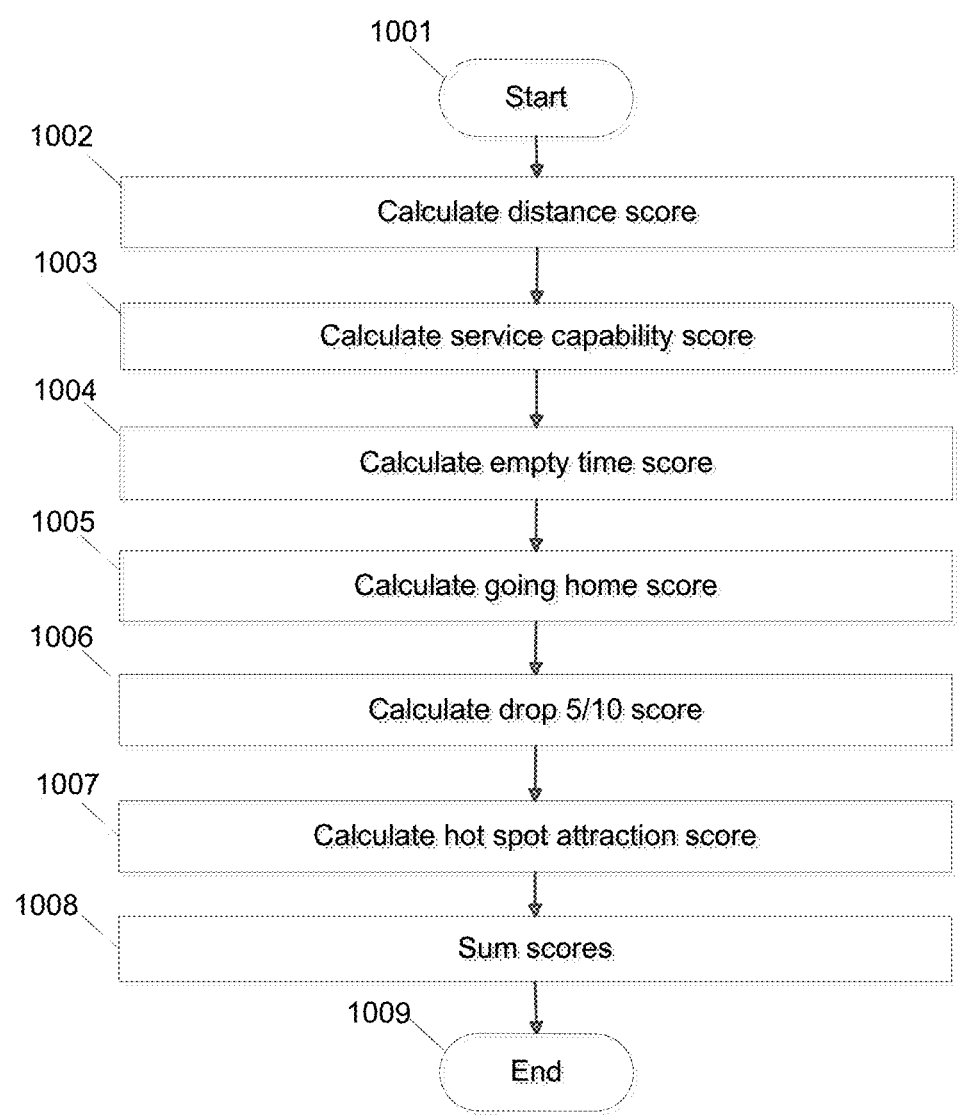
FIG. 10 is a flow chart illustrating calculating a score for a combination of a vehicle/driver pair in relation to a booking, and is performed by the system of FIG. 8a or the system of FIG. 8b.

A method of scoring a vehicle against a booking will now be described with reference to FIG. 10. The scoring process of FIG. 10 is performed by the job allocation module 105.

The operation starts at step 1001. In brief, different scores are calculated at steps 1002 to 1007, and at step 1008 the scores are summed together. Clearly, it will be appreciated that the scores may be calculated in any order, and may be calculated wholly or partly in parallel.

At step 1002, a distance score is calculated. The distance score allows the distance between a vehicle and the pick-up location of the booking to be taken into account when scoring the vehicle against the booking. The distance score is calculated as the distance between the current position of the vehicle and the pick-up address. The distance has the unit of miles, but it may alternatively be kilometers. The distance is calculated as the distance that will need to be travelled by the vehicle to reach the pick-up address, taking into account road layout, one way streets etc. This is known as the road distance. The shortest route from the vehicle to the pick-up address is used for the distance location, even if this is not the quickest route. The route and the road distance thereof are calculated by the system 100 using information from the historical database 132. It is the last recorded position of the vehicle that is used in the distance score calculation.

An administrator or other operator of the system 100 may apply a setting such that the distance score is always zero, in which case the distance between the vehicle and the pick-up location is not taken into account in the score calculation.

At step 1003, a service compatibility score is calculated. The service compatibility score results in the taking into account of the car type preference that was specified in the booking against the type of the vehicle that is being scored. If the type of vehicle that is being costed is the same type as that is specified in the booking, or is consistent with that type, then the service compatibility score is zero. The service compatibility score takes a positive value if there is incompatibility between the service type of the booking and the type of vehicle that is being costed. In the case of the booking specifying a VIP and the vehicle being costed being a standard vehicle, a penalty of 500 may be provided as the service compatibility score. This penalty helps to ensure that a VIP vehicle will be provided to fulfill the booking if one is available, but if not then a standard car can be provided.

In the case of the booking specifying a standard four passenger vehicle, a penalty score of 50 points is provided for a vehicle that is a seven-seater vehicle. This helps in ensuring that the booking is serviced with a suitable car, but also contributes to avoiding the removal of a large capacity vehicle from the pool of available vehicles unnecessarily.

In the case of the booking being for a standard car and the vehicle type being a VIP car, a penalty score of 100 is provided. Similarly to the situation described in relation to the larger capacity vehicle, this helps to ensure that the booking is satisfied whilst not removing VIP vehicles from the available fleet unnecessarily.

At step 1004, an empty time score is calculated. The empty time score allows the utilization of the vehicle (and corresponding driver) to be taken into account in the scoring of the vehicle in relation to the booking.

The empty time score is calculated as the product of −1 and the time (in minutes) since the last job allocated to the car/driver combination was completed and a cost per empty minute. The cost per empty minute is in effect a weighting factor. The weighting factor may be set by an administrator of the system 100. For a vehicle that is in the state POB, the empty time score is zero.

The inclusion of an empty time score in the operation of FIG. 10 helps to provide load balancing of the vehicles, and load balancing of the drivers. Vehicle load balancing helps to even out wear and tear on different vehicles in the fleet on a unit time basis. Load balancing of drivers is useful because it helps to prevent the likelihood of drivers performing too many consecutive jobs with insufficient breaks in between the jobs, and it also helps to reduce the likelihood that drivers will wait for long periods between jobs. Load balancing of drivers, through use of the empty time score in the costing operation, helps to prevent driver fatigue and thus improves safety.

At step 1005, a going home score is calculated. If the status of the driver is 'going home', then a score is calculated. If the driver has some other state, then the going home score is zero.

If the driver's status is 'going home', the going home score is calculated as the product of −1 and the number of saved miles and a distance criteria. The saved miles component of the score provides a measure of how much closer to their home the driver would be if they fulfilled this booking. The saved miles component is calculated as the current distance to home (which is the road distance from the current location of the vehicle to the driver's home address) minus the distance between the drop off address and home (which is the road distance from the drop off location of the booking to the driver's home address). The distance criteria provides a weighting, and may be set by an administrator of the system 100.

The effect of the inclusion of the going home score is to increase the likelihood that a job will be allocated to a driver who is on the way to their home (for instance for a lunch break or having finished their shift) if the job would take the driver to a location that is nearer to their home. The magnitude of the score depends on the distance that would be saved, so a score is obtained if the drop off location is relatively closer to the driver's home address.

At step 1006, a drop 5/10 score is calculated. For drivers that have a 'drop in 5' or a 'drop in 10' status, the drop 5/10 score has a positive value. For drivers that do not have a 'drop in 5' or a 'drop in 10' status, that is for drivers that are vacant and not allocated to a booking, the drop 5/10 score is zero. The status of the vehicle is set by the driver through their driver's device 110. In particular, when the driver's device 110 calculates that there are fewer than 10 minutes remaining in the journey to the drop off address, the driver's device 110 provides an option to the user to adopt the 'drop in 10' status. If the driver selects this option on the driver's device 110 (when the vehicle is stationary), the 'drop in 10' status is entered. Similarly, when the driver's device 110 detects that there are fewer than five minutes remaining in the journey to the drop off location, the driver's device 110 provides an option to allow the driver to select entering the 'drop in 5' status.

If the driver of the vehicle has a 'drop in 5' status, a score of 20 points is calculated. If the driver has the 'drop in 10' status, a score of 30 points is calculated.

The calculation of a drop 5/10 score allows vehicles that have a POB status (that is, they have a job in progress) to be considered for allocation to a booking. However, a penalty is applied to them with the result that they are less favored than vehicles that are currently empty. This provides protection against the driver arriving late for the booking if there are unexpected delays in the previous journey.

At step 1007, a hot spot attraction score is calculated. This is described in more detail below. In brief, the inclusion of the hot spot attraction score causes organic attraction of vehicles towards hot spots, in order better to service customers and better to manage the fleet of vehicles.

At step 1008, the scores calculated in steps 1002 to 1007 are summed, to provide a total score for the driver/vehicle/booking combination. This score is then used in an allocation process, as will now be described in reference to FIG. 11. The allocation process of FIG. 11 is performed by the job allocation module 105.

Figure 11:
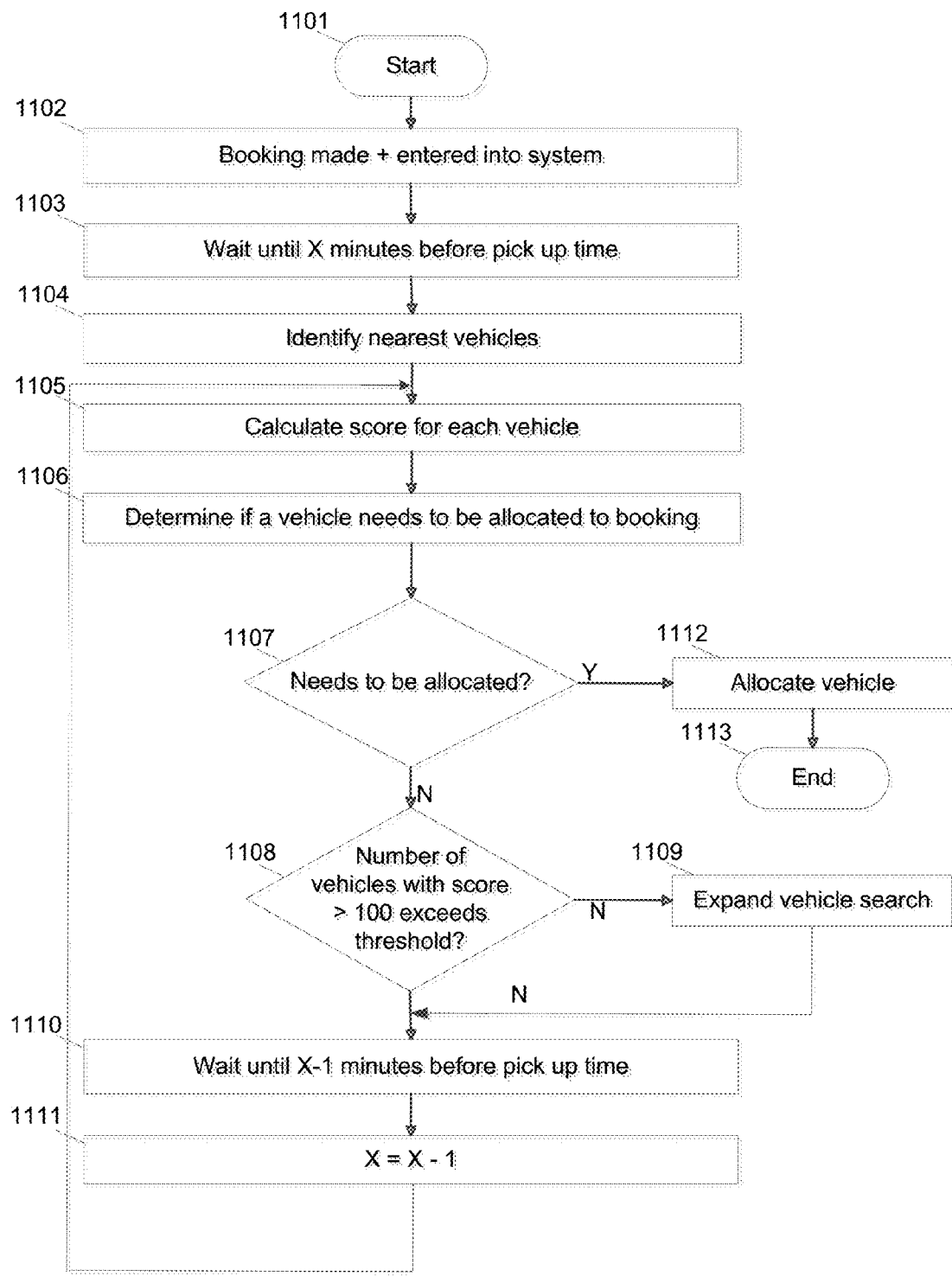
FIG. 11 is a flow chart illustrating allocation of a vehicle/driver pairing in relation to a booking, and is performed by the system of FIG. 8a or the system of FIG. 8b.

Referring to FIG. 11, the operation starts at step 1101.

At step 1102, a booking is made and entered onto the system. This corresponds to step 902 of FIG. 9.

At step 1103, the job allocation module 105 waits until X minutes before the pick-up time for the booking. This results in the allocation process being commenced a predetermined time before the pick-up time (on the correct date). For instance, the value of X may be 20, in which case the allocation process starts 20 minutes before the scheduled pick-up time.

At step 1104, the job allocation module 45 selects the Y vehicles that are nearest to the pick-up location of the booking. The value of Y may for instance be 20 or 30. The vehicles are determined to be nearest if they have shortest crow fly distance between their current location (which is their last reported location) and the location of the pick-up address. The distance is calculated as the straight line distance between the latitude and longitude coordinates of the location of the vehicle and the location corresponding to the pick-up address. The use of crow fly distances in step 1104 results in an appropriate number of vehicles being selected for possible allocation to the job but without requiring the processing needed to calculate road distances and routes for each of the vehicles. In step 1104 it is only vehicles that have the status of available, going home, drop in 5 or drop in 10 that can be selected. The result is a pool of candidate vehicles for the booking.

At step 1105, a score is calculated for the vehicle/booking combination for each of the vehicles that were selected in step 1104. The score is calculated as described above with reference to FIG. 10. The result is a numerical value that is an indication of the suitability of the vehicle for the booking.

At step 1106, the job allocation module 105 determines whether a vehicle needs to be allocated to the booking. This involves determining whether there is one vehicle that is the clear best match for the booking or whether there is only one vehicle (or a small number of vehicles, e.g. 2 or 3 vehicles) that would be able to reach the pick-up location on or before the pick-up time.

There are a number of options for implementation of step 1106, two of which will now be described.

In one alternative, a comparison is made of the scores for the vehicles as calculated in step 1105. Because of the way the scoring is achieved, a lower numerical value indicates a greater suitability to the booking. As such, the vehicle with the lowest score is the one that is most suitable for the booking. If at step 1106 it is determined that the vehicle with the lowest score has a score that is much lower than the second lowest score, it can be determined that the vehicle with the lowest score is sufficiently well suited to the booking that it needs to be allocated to the booking.

Alternatively, the determination that the vehicle needs to be allocated to the booking may be made if the time remaining to the pick-up time is the same as or less than a threshold amount more than the expected journey time from the lowest scoring vehicle to the pick-up address. The threshold provides a buffer. The threshold amount may be two minutes for instance. This is particularly advantageous because it results in the determination that a vehicle needs to be allocated only at the time (or perhaps shortly before the time) when the vehicle would need to leave its current location to arrive at the pick-up location in time to collect the customer on time. By making the determination in respect of the lowest scoring vehicle, it is the vehicle that is best suited to the booking that is determined to be required to be allocated to the booking even if that vehicle is not the vehicle that is closest to the pick-up location or has the shortest journey to the pick-up location.

At step 1107, it is determined whether at step 1106 it was determined that a vehicle needs to be allocated. If a vehicle does need to be allocated, the vehicle with the lowest score is allocated to the booking at step 1112 before the operation ends at step 1113.

If it is not determined that the vehicle needs to be allocated, which occurs when there is not one clear best vehicle for the booking and when there are plural vehicles that would be able to reach the pick-up location in time to meet the booking, the operation proceeds to step 1108.

The configuration of the job allocation module 105 to allocate a vehicle to the booking at the last minute, or 'just in time', unless there is a clear best vehicle, increases the flexibility of allocation of vehicle resources of the fleet. It also contributes to reducing the overall mileage that is travelled by the vehicles of fleet in order to satisfy the bookings that are received by the system 100.

An optional step 1108 follows step 1107. Here, it is determined whether the number of vehicles that are reasonable candidates for allocation to the booking is sufficient. In particular, step 1108 involves determining whether the number of vehicles with a score less than a threshold value (in this example the threshold value is 100) exceeds a threshold number of vehicles (for instance 5 vehicles). If there are insufficient vehicles, at step 1109 the vehicles search is expanded to include further vehicles in the pool of candidate vehicles for the booking. The further vehicles are added to the vehicles that are identified at step 1104, and the further vehicles have scores calculated for them in step 1105 on subsequent performance of that step.

After step 1109 or after step 1108 revealing that there are sufficient vehicles, at step 1110 the job allocation module 105 waits until X−1 minutes before the pick-up time. Once this time has been reached, the value of X is decremented at step 1111 and the operation returns to step 1105, where a new score is calculated for each vehicle in the candidate pool of vehicles. The effect of steps 1110 and 1111 is that scores are calculated for vehicles in the candidate pool of vehicles once every minute until a vehicle allocated to the booking.

On subsequent performance of step 1105 in relation to a given booking, a different result may be achieved. In particular, the status and locations of the vehicles in the candidate pool of vehicles may have changed such that there now is one clear best candidate vehicle for allocation to the booking, or that the lowest scoring candidate needs to be allocated now so that they may arrive at the pick-up location in time (because the journey time from the current location of the best scoring vehicle to the pick-up location is the same as or the slightly greater than the time remaining to the pick-up time).

On subsequent execution of step 1105, vehicles that no longer have one of the relevant statuses (available, drop in 5 or drop in 10) are removed from the candidate pool of vehicles and are not scored. As such, the size of the candidate pool of the vehicles typically reduces on subsequent executions of step 1105. If the number of potentially suitable vehicles falls too low, this is addressed by action of steps 1108 and 1109, where the vehicle search is expanded and the candidate pool is added to.

It will be appreciated from the above that steps 1105 and 1106 are repeated until a vehicle is allocated to the booking. The number of times that the steps are repeated depends on the initial value of X, which dictates how long before the pick-up time allocation process begins, and the number of minutes before the pick-up time that the vehicle is allocated to the booking. For bookings in central city locations where there are relatively large number of vehicles, bookings may be allocated only a small number of minutes, for instance 2, 3 or 4 minutes, before pick-up times. For bookings in more remote locations, where there may be relatively few vehicles and a low vehicle density, bookings may be allocated significantly longer before the pick-up time, for instance 12, 15 or 18 minutes before the pick-up time.

For vehicle fleets with relatively low vehicle densities, having regard to the covered geographical area, a higher value of X may be appropriate. Advantageously, the value of X, which indicates the number of minutes prior to the pick-up time that the allocation process begins, may be set by an administrator of the system.

Similarly, the value of Y, which determines the number of vehicles that are identified for selection in the pool of vehicles at step 1104 may be set by an administrator of the system 100.

The handling of hot spots and the allocation of vehicles when hot spots are in use will now be described.

A hot spot may be created automatically by the core system 101 following detection that trigger conditions exist. Such a hot spot may be termed a busy region hot spot or a dynamic hot spot. Alternatively a hot spot may be created by an administrator or system controller such as to be active at a predetermined time in the future. Such a hot spot may be configured to become active at multiple times in the future, for instance at regular times. Such a hot spot may be termed a scheduled hot spot. Lastly, a hot spot may be created manually by an administrator of the system 100 or a system controller for immediate operation.

A hot spot is defined by hot spot definition information, as follows.

The hot spot definition information includes a definition of a hot spot area. The hot spot area is the area to which vehicles are to be attracted, and typically coincides with the area where there currently is or is expected to be a particularly high number of booking pickups required in a given time period. The hot spot area may be defined in terms of one or more predefined zones of the area covered by the operator of the system 100. The zones may be identified by a zone number or other alphanumeric identifier for instance, and may for instance correspond to postcode areas or other administrative districts. The hot spot area may alternatively be defined by a distance and a central location that together define a circular hot spot area.

The hot spot definition information includes a hot spot attraction distance. This defines a distance for which vehicles are attracted to the hot spot. In some embodiments relating to scheduled hot spots, this defines a distance for which vehicles are downscored (i.e. a penalty score is provided) for bookings with pickup locations that are not in the hot spot. In some embodiments relating to busy region hot spots, this defines a distance within which drop off locations qualify bookings for upscoring certain vehicles.

The hot spot definition information may also include a hot spot centre location. This is the location used to calculate whether a vehicle or drop off location is within the hot spot attraction distance of the hot spot. If the hot spot area is defined by a distance and a central location, this may be the same as the hot spot centre location. Instead of the hot spot definition information including a hot spot centre location, the boundary of the hot spot area may be used to calculate whether a vehicle or drop off location is within the hot spot attraction distance of the hot spot.

The hot spot definition information may also include a bonus parameter value. This parameter value relates to a degree by which vehicles are attracted to the hot spot. The bonus parameter value may be a per unit distance parameter in that the amount of attraction (or repulsion) is dependent on a distance between the vehicle or drop off location and the hot spot. Here the bonus parameter value may be termed a bonus per mile parameter value. The bonus parameter is a weighting parameter.

The hot spot definition information may additionally include one or more vehicle types. This indicates vehicle types that are desired to be attracted to the hot spot. If no vehicle types are specified as part of the hot spot definition information, then all vehicles types are equally attracted to the hot spot. Dynamic hot spots (for which, see the discussion below) advantageously do not specify any particular vehicle types. Scheduled hot spots (for which, see the discussion below) may specify VIP or Green (electric vehicles or hybrid vehicles) vehicle types, for instance.

If the hot spot is a scheduled hot spot, then the hot spot definition information includes start and end times and also operational days of the week or other periodicity information (e.g. the first Monday of each month).

Each hot spot also includes an identifier or name that is unique within the system 10 or the core system 101 for identifying the hot spot and for distinguishing it from other hot spots that are stored in the system 10 or the core system 101.

The system 10 and/or the core system 101 may provide a user interface for allowing an administrator or other operator to set hot spots. The user interface includes means for allowing the administrator/operator to enter the hot spot definition information discussed above. The core system may include default values for some of the hot spot definition information that are stored as part of the hot spot definition unless the default value is changed by the administrator/operator. For instance, the core system 101 may include default values for the hot spot attraction distance (3 miles/5 kilometers has been found to be a suitable default value) and/or the bonus per mile parameter value (0.8 has been found to be a suitable default value).

The user interface allows the administrator or other operator to schedule hot spots for future times, and may allow them to be scheduled to occur regularly. For instance, a hot spot may be scheduled to occur every weekday in the zone that covers the financial district of a city, the hot spot relating to VIP type vehicles and being active from 4 pm to 6 pm. This causes the drawing of VIP vehicles to the financial district at times when there is always a high demand for VIP vehicles, the demand being provided by senior executives to travel to airports, train stations or their homes. For instance, a hot spot may be scheduled to occur every weekday in the zone that covers the legal district of a city, the hot spot relating to any type of vehicle and being active from 10 pm to 10.30 pm. This causes the drawing of vehicles to the legal district at times when there is high demand for vehicles, the demand being provided because 10 pm is a trigger time when legal firms will allow employees to travel home by private hire vehicle on the firm's account with the operator of the system 100.

The system 10 and/or the core system 101 may be configured to monitor the locations of vehicles, the statuses of vehicles (available, POB, allocated etc.), bookings that have been made but not yet allocated, and bookings that have been allocated but not yet commenced (i.e. the customer has not yet been collected from the pickup location specified in the booking). Information about bookings that is monitored includes pickup locations and start times. Based on the monitored information, the core system 101 is configured to detect unusually high demand in an area or an especially high imbalance in an area between supply and demand (for instance compared to an average across the fleet) and to automatically set hot spots based on the detection. The areas detected to have unusually high demand or an especially high imbalance are termed 'busy regions'. A hot spot created automatically in response to detection of a busy region can be termed a 'dynamic hot spot'.

Unusually high demand in an area (e.g. a zone) may for instance be determined when it is detected that the number of bookings with pickup locations in the area over a certain period (for instance 30 minutes) exceeds an average for the area by a threshold amount. The average may be for the particular time of day and day of the week, thereby causing activation of hot spots only when bookings for the area are unusually high having regard to the usual conditions at that particular time. The threshold may be an absolute amount higher than the average or it may be a multiple of the average. The threshold may for instance be set at 1.8 times the average number of bookings. It may alternatively be set at 88 bookings in a 30 minute period based on an average of 54 bookings per 30 minutes.

An imbalance of supply versus demand may be determined compared to supply and demand levels across the fleet or in a larger area (e.g. the central zone or the western zone of London). Supply and demand levels may be based for instance on numbers of vehicles with a suitable status, for instance one of 'available', 'drop in 5' or 'drop in 10', in the zone or in an adjacent zone against the numbers of bookings recorded for a 30 minute period. An imbalance may be determined with reference to a threshold. The threshold may be set as an absolute amount or as a proportion of the relevant metric. For instance, the threshold may be set as a ratio of 1:2 (#suitable status:#bookings) or may be set as (#bookings-#suitable status)+30 vehicles, where #bookings denotes the number of bookings and #suitable status denotes the number of vehicles with a suitable status.

Because the system 10 and/or the core system 101 may be capable of receiving advance bookings, some measure of the likely number of bookings is known in advance, although a certain proportion of bookings usually are made at short notice. This allows the system 10 and/or the core system 101 to make determinations of unusually high demand in advance, and thus to set busy region (dynamic) hot spots in advance of the demand or at least in advance of the peak demand.

The automatic setting of hot spots by the core system 101 based on the automatic detection of a need for a hot spot involves the core system 101 providing the various parameters for the hot spot definition information.

The hot spot definition information includes a definition of a hot spot area, which is the area where the unusually high booking pickups were detected. Typically the area is a zone. The hot spot centre location typically is the centre of the zone.

The hot spot attraction distance may take a default value (e.g. 3 miles or 5 kilometers) or it may be dependent on the determined demand, e.g. a larger demand or imbalance of supply versus demand equates to a larger hot spot attraction distance. A scheduled hot spot has a hot spot attraction distance that is predetermined prior to the hot spot becoming active, and is stored as part of the hot spot definition information. A dynamic hot spot may first become active with a default value for the hot spot attraction distance and may vary dependent on demand.

The bonus parameter value may have a default value. Alternatively, the bonus parameter value may be dependent on the determined demand, e.g. a larger demand or imbalance of supply versus demand equates a larger bonus parameter value. A scheduled hot spot has a bonus parameter that is predetermined prior to the hot spot becoming active, and is stored as part of the hot spot definition information. A dynamic hot spot may first become active with a default value for the bonus parameter and may vary if more busy regions become active.

If the hot spot is one that is scheduled to operate, then the hot spot definition information includes start and end times with values determined by the core system 101 to be appropriate having regard to the profile of bookings with pickup locations in the hot spot area.

Each hot spot also includes an identifier or name that is unique within the system 10 and/or the core system 101 for identifying the hot spot and for distinguishing it from other hot spots that are stored in the system 10 (e.g., in the priority location database 16) and/or the core system 101. Once operation of the hot spot is ended, the hot spot name may be released for use by another hot spot in the future.

As mentioned above, when a hot spot is in operation the allocation of vehicles to bookings takes account of the hot spots in the scoring of vehicles in such a way as to attract vehicles to the hot spot, so that they can pick up booked customers from addresses in the hot spot. This occurs slightly differently for different types of hot spots.

In brief, this occurs in some embodiments by providing a penalty to (downscoring) vehicles that are located relatively close to the hot spot for bookings that have pickup locations outside the hot spot. This results in an increased chance that the booking will be allocated to a vehicle that is not close to the hot spot, thereby allowing the vehicles that are close to the hot spot to be allocated to bookings with pickup locations in the hot spot. For bookings with pickup locations in the hot spot, no adjustment of scores for any vehicle as a result of the hot spot is provided. This allows bookings with pickup locations in the hot spot to be met by the naturally best vehicle for the booking, according to the scoring and allocation processes described above. This technique is particularly suited for hot spots that do not relate specifically to one or more vehicle types, although it provides the desired drawing of vehicles also when the hot spot does relate specifically to one or more vehicle types.

In some other embodiments, for hot spots that do relate specifically to one or more vehicle types, vehicles of a type consistent with the hot spot definition information are upscored (given a negative penalty score, so making their score better) for bookings which both have a drop off location that are relatively close to the hot spot or within the hot spot and specify a vehicle of a different (yet consistent) type. For instance, if the hot spot relates to vehicles of the VIP type, VIP vehicles are upscored for bookings for regular (non-VIP) 4 passenger vehicles if the drop off location is in or near the hot spot. This helps to bring vehicles of the desired type to be brought to the vicinity of the hot spot but without requiring them to travel empty (without passengers) the entire distance.

Additionally, once a hot spot has been set up and become active, the drivers devices associated with vehicles that are relatively close to the busy region and/or the corresponding hot spot may be messaged by the drivers' devices server 107 so as to inform the drivers of the vehicles of the busy region/hot spot. This is particularly the case for dynamic hot spots, but may apply also to scheduled hot spots. The drivers devices may be selected for receiving the message for instance if they are within the hot spot attraction distance of the centre of the hot spot or if they are within a multiple (e.g. 1.5) of the hot spot attraction distance of the centre of the hot spot. The message may for instance indicate that a busy region exists or that a hot spot is active, and indicate the zone or zones that form the area of the hot spot. Although scheduled hot spots may not be announced to drivers, if they are so announced then the message may indicate a start time and/or an end time of the hot spot. Upon receipt of such a message, drivers may choose to navigate towards the hot spot if their status is 'available', in order better to be allocated a booking with a pickup location within the hot spot. This serves to provide a better service to the customer and to increase overall fleet utilization. However, due to the scoring and allocation, vehicles are caused to migrate towards the hot spot even without this messaging.

There are a number of options for calculating the hot spot penalty score at step 1008 of FIG. 10.

A first option will now be described. This relates to dynamic hot spots. If the hot spot definition information specifies one or more vehicle types, the hot spot attraction score is calculated only for vehicles of one of the specified types. If the hot spot definition information does not specify any vehicle type, or specifies all types, the hot spot attraction score is calculated for all vehicles regardless of their type. This may be achieved by setting the hot spot attraction score to zero if the hot spot information specifies one or more vehicle types and the vehicle type of the vehicle being scored is not consistent with the vehicle type(s) specified in the hot spot information.

The hot spot attraction score is calculated as:

$$\text{score} = (\text{max distance} - \text{distance to hot spot}) * \text{bonus value}$$

where: 'bonus value' is the value of the bonus parameter, 'distance to hot spot' is the distance between the vehicle position and the hot spot, and 'max distance' is the hot spot attraction distance. The vehicle position is the current location of the vehicle if the status of the vehicle is 'available' and is the drop off location for a booking currently being fulfilled if the status of the vehicle is 'POB', 'drop in 5' or 'drop in 10'.

The hot spot attraction score is set as zero if the distance between the vehicle position and the centre of the hot spot is greater that the hot spot attraction distance. In this way, only vehicles that are within the hot spot attraction distance of the hot spot can have a hot spot attraction score.

The value of the bonus parameter sets a weighting for the hot spot component as regards other components of the score for a vehicle against a booking.

The hot spot attraction score is only calculated for bookings for which the pickup location is not within a hot spot.

Through the hot spot attraction score calculation shown above, it will be seen that the hot spot attraction score is higher for higher hot spot attraction distances. This means that a higher hot spot attraction distance will serve to draw in vehicles from a wider area and also will serve more strongly to draw in vehicles at a given distance from the centre of the hot spot.

It will also be seen that the hot spot attraction score is higher for vehicles that are closer to the centre of the hot spot. This serves to draw vehicles to the hot spot more strongly if they are already relatively close. This helps to reduce overall distance travelled by the fleet in fulfilling bookings. Reduced distance travelled equates to lower fuel consumption, lower vehicle wear and tear, lower chance of accidents, lower driver fatigue, and generally lower costs.

It may help understanding of the effect of the first option for calculating the hot spot attraction score on the allocation of vehicles by considering the following example. In the example, a hot spot is active in a first zone. A booking has a pickup location in a second zone, which is adjacent the first zone, and a start time that occurs whilst the hot spot is active. A vehicle with status 'available' (for instance it may have only just entered this status after dropping a customer of a preceding booking) is located very near to the pickup location for the booking. Ordinarily the vehicle would score well for the booking and the booking would likely be allocated to the vehicle. However, a hot spot attraction score is included in the cost scoring for the vehicle because the vehicle is close to the hot spot, and this score constitutes a penalty score against the booking that is outside the hot spot. This hot spot attraction score means that the vehicle scores less well against the booking. The same applies to other 'available' vehicles who are close to the hot spot. The result is that vehicles that are near zone 2 but not near zone 1 are more likely to be allocated the booking, even though they are further away than the vehicle that is very close to the booking pickup location. This has two effects. First, it draws in a vehicle to fulfill the booking from a location that is not close to the hot spot to a location that is relatively close to the hot spot. Secondly, it allows the vehicle that is close to the booking pickup location to be allocated a booking with a pickup location in the hot spot. Because the hot spot has been set up because of unusually high demand within the hot spot area, the vehicle will typically very quickly be allocated a booking with a pickup location within the hot spot.

This example also allows it to be understood how the inclusion in the hot spot attraction score of the hot spot attraction distance results in vehicles being drawn towards the hot spot from a greater distance. In particular, a hot spot attraction distance that covers not only the second zone but also the next zone outwards (away from the first zone) would increase the chances that a vehicle from a greater distance away from the hot spot would be allocated to the booking. However, because the score is dependent on the distance of the vehicle from the hot spot, vehicles that are just a short distance less than the hot spot attraction distance from the hot spot would have a low penalty score and are less likely to be allocated to the booking.

In the calculation of the distance from the vehicle to the centre of the hot spot, it is the direct (crow fly) distance that is used. To determine the crow fly distance, the distance between their current location (which is their last reported location, as described above vehicle locations usually are reported every 30 seconds) and the location of the centre of the hot spot is calculated. The distance is calculated as the straight line distance between the latitude and longitude coordinates of the location of the vehicle and the latitude and longitude coordinates of the location corresponding to the centre of the hot spot. The calculation of crow fly distances is relatively computationally non-intensive. Alternatively, a road route may be calculated and used in place of the crow fly distance, although this utilizes more computing resources.

When hot spot definition information specifies one or more vehicle types (e.g. the VIP vehicle type or the Green vehicle type), vehicles of that type are not allocated to certain bookings once the vehicle is within the hot spot attraction distance. The bookings that apply in this case are bookings that do not require that vehicle type specified in the hot spot definition information and for which the drop off location is relatively remote from the hot spot, for instance because the drop off location is further from the centre of the hot spot that the vehicle's current location or the drop off location is more than a threshold distance from the centre of the hot spot. This can be achieved by the addition of a high penalty score when scoring the vehicle against bookings that do not specify the vehicle type, the scoring taking into account the drop off location and the hot spot location information. This feature helps to prevent vehicles of the type required by the hot spot definition information leaving the vicinity of the hot spot, unless a booking of the type for which the hot spot was created causes them to leave the vicinity.

In the case where a vehicle is within the hot spot attraction distance of two separate hot spots, the score for the vehicle may include two separate hot spot attraction scores (one for each hot spot) or it may include a hot spot attraction score that is a function of the two scores. For instance, it may include a hot spot attraction score that is the greatest of the two scores or is the mean of the two scores.

A second option will now be described. This relates to hot spots for which the hot spot definition information specifies one or more vehicle types, and which typically are scheduled hot spots but which may be dynamic hot spots or may be hot spots which were manually created for immediate commencement.

The hot spot attraction score is calculated only for vehicles of one of the types specified in the hot spot definition information.

The hot spot attraction score is calculated as:

$$\text{score} = (\text{max distance} - \text{distance to hot spot}) * \text{bonus value}$$

where: 'bonus value' is the value of the bonus parameter, 'distance to hot spot' is the distance between the hot spot and the drop off location for the booking, and 'max distance' is the hot spot attraction distance.

The hot spot attraction score is set as zero if the distance between the drop off location for the booking and the centre of the hot spot is greater that the hot spot attraction distance. In this way, only bookings for which the drop off location is within the hot spot attraction distance of the hot spot can provide a hot spot attraction score for vehicles of the desired vehicle type.

Additionally, the hot spot score is set to zero if the estimated drop off time for the booking is outside of the active time period for the hot spot. The hot spot attraction score is calculated for vehicles a predetermined time (for instance one hour) before the active time period for the hot spot starts. This causes relevant vehicles to start their journeys to the hot spot at times before the hot spot becomes active. It also stops vehicles being drawn to the hot spot if they would arrive after the hot spot has become inactive.

The value of the bonus parameter sets a weighting for the hot spot component as regards other components of the score for a vehicle against a booking. The bonus score is negative, which then provides a negative hot spot attraction score for the relevant vehicles. Because lower scores are better, the use of a negative hot spot attraction score provides a better score for the relevant vehicles. In embodiments in which a higher score is better, the hot spot attraction score is positive, to improve the scoring for the relevant vehicles.

The hot spot attraction score is only calculated independently of the pickup location for the booking. Through operation of the allocation process of FIG. 11, only Y vehicles are scored for the booking. Usually, only a fraction of those Y vehicles are of a type specified for the hot spot. When a hot spot specifying a specific vehicle type is active, the vehicle resource allocation module 15 and/or the job allocation module 105 may identify further vehicles of the correct vehicle type that are at or will be relatively close to the pickup location for scoring against the booking. This may be dependent on the number of vehicles that are of the correct type for the hot spot falling below a threshold.

Through the hot spot attraction score calculation shown above, it will be seen that the hot spot attraction score is higher for higher hot spot attraction distances. This means that a higher hot spot attraction distance will serve to draw in vehicles to a wider area around the hot spot and also will serve more strongly to draw in vehicles to a given distance from the centre of the hot spot.

It will also be seen that the hot spot attraction score is higher for drop off locations that are closer to the centre of the hot spot. This serves to draw vehicles to the hot spot more strongly if the drop off location for the booking is relatively close to the hot spot. This helps to reduce overall distance travelled by the fleet in fulfilling bookings. Reduced distance travelled equates to lower fuel consumption, lower vehicle wear and tear, lower chance of accidents, lower driver fatigue, and generally lower costs.

It may help understanding of the effect of the second option for calculating the hot spot attraction score on the allocation of vehicles by considering the following example.

In the example, a hot spot for vehicles of the type VIP is active or is schedule to become active in a first zone. A booking for a regular 4 seater vehicle has a pickup location anywhere, either near to or remote from the first zone. The drop off location for the booking is near to the hot spot, for instance in a second zone adjacent to the first zone. The start time of the booking is later than the predetermined period (e.g. 60 minutes) before the hot spot becomes active, or is whilst the hot spot is active. A VIP vehicle with status 'available' (for instance it may have only just entered this status after dropping a customer of a preceding booking) is located some distance away (e.g. 2 miles/3 kilometers) from the pickup location for the booking. Ordinarily the vehicle would not score particularly well for the booking because of the distance to the pickup location and the inappropriate vehicle type and the booking would likely not be allocated to the vehicle. However, a hot spot attraction score is included in the cost scoring for the vehicle because the vehicle is of the type specified in the hot spot definition information and because the drop off location is within the hot spot attraction distance of the hot spot, and this score constitutes a bonus score (a negative penalty score) against the booking. This hot spot attraction score means that the VIP vehicle scores better against the booking. The same applies to other VIP vehicles that are in the vicinity of the pickup location for the booking. The result is that one of the VIP vehicles that is scored for the booking is more likely to be allocated the booking, even though they might be further away from the pickup location than vehicles that are of other types and which may score better on other aspects of the FIG. 3 scoring process. This has the effect of drawing a VIP vehicle to a location that is relatively close to the hot spot. Moreover, this is achieved without requiring the VIP vehicle to travel empty; instead it does so whilst fulfilling a customer booking. Once the VIP vehicle drops off the customer at the drop off location, the vehicle is located close to the hot spot and can more easily and more efficiently fulfill a booking with a pickup location in the hot spot and requiring the VIP vehicle type. Thus, the distance travelled by the VIP vehicle without a customer on board is reduced. Also, the availability of VIP cars in the hot spot is increased, thereby allowing the fleet better to meet customers' vehicle type preferences when fulfilling bookings. The VIP vehicle starts to be considered for bookings that have pickup locations within the hot spot once the VIP vehicle has the status POB on the previous booking, i.e. the booking that is drawing the vehicle to the hot spot.

This example also allows it to be understood how the inclusion in the hot spot attraction score of the hot spot attraction distance results in more vehicles of the desired vehicle type being drawn towards the hot spot. In particular, a hot spot attraction distance that covers not only the second zone but also the next zone outwards (away from the first zone) would increase the chances that a booking for a vehicle of a different type would be used to bring a vehicle of the desired type to a location near to the hot spot. However, because the hot spot attraction score is dependent on the distance of the drop off location from the hot spot, for bookings with drop off locations that are just a short distance less than the hot spot attraction distance from the hot spot vehicles of the desired type would have a low bonus score and would be less likely to be allocated to the booking.

In the calculation of the distance from the drop off location for the booking to the centre of the hot spot, it is the direct (crow fly) distance that is used. The distance is calculated as the straight line distance between the latitude and longitude coordinates of the location of the vehicle and the latitude and longitude coordinates of the location corresponding to the centre of the hot spot. The calculation of crow fly distances is relatively computationally non-intensive. Alternatively, a road route may be calculated and used in place of the crow fly distance, although this utilizes more computing resources.

Each scheduled hot spot may include a setting that imposes a cap on the number of vehicles per unit time with non-zero hot spot scores that are allocated to bookings. For instance, the setting may cap the number of vehicles at 20 or 30 per hour. This helps to prevent over-pooling of resources in one location.

In the case where the drop off location for a booking is within the hot spot attraction distance of two separate hot spots, the score for the vehicle may include two separate hot spot attraction scores (one for each hot spot) or it may include a hot spot attraction score that is a function of the two scores. For instance, it may include a hot spot attraction score that is the greatest of the two scores or is the mean of the two scores.

Figure 8B:
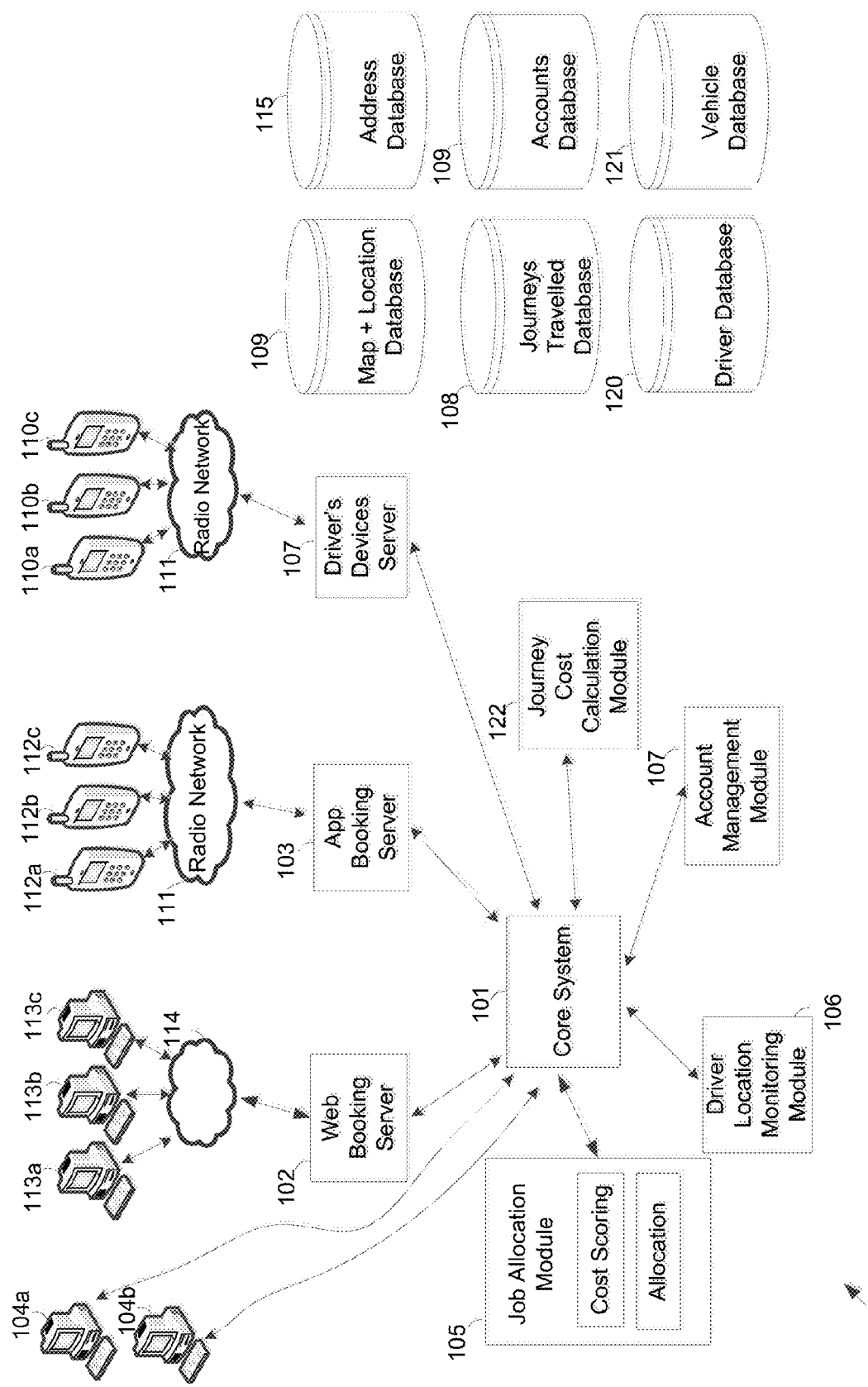
FIG. 8b is a schematic diagram of a different configuration of the FIG. 8a system for management of a private hire vehicle service according to various aspects of the present invention.

Instead of the database functions being provided by a small number of databases, in the above embodiments the operational database 130 and the driver network database 131, as well as the historical database 132, the functions may be split between a higher number of databases, as shown in the system 100 of FIG. 8b. Reference numerals are retained from FIG. 8a for like elements, and these elements are not described again here to avoid repetition.

In the FIG. 8b system, an accounts database 119 is configured to store the detail of every account held with the operator of the system 100. The record keeping function is provided primarily by a journeys travelled database 108 and a map and locations database 109, as well as other components of the system 100. Each vehicle has a respective record in a vehicle database 121. Each driver has a record in a driver database 120. Pick-up and drop off addresses are selected from one of the plurality of addresses stored in an address database 115. Once a job has been allocated to a particular driver and a particular vehicle, this is recorded in the journeys travelled database 108 along with an indication that the journey has not yet been travelled.

The core system 101, the web booking server 102, the application booking server 103, the job allocation module 105, the driver location monitoring module 106 and the driver's devices server 107 may be provided by a single server or by a system of cooperating servers, for instance arranged in a cluster. Each of the core system 101, the web booking server 102, the application booking server 103, the job allocation module 105, the driver location monitoring module 106 and the driver's devices server 107 includes dedicated software modules that are specific to that component. In the cases of multiple servers being used, each component may include a respective server (or more than one server) or some components may share a server or server system.

In some embodiments, the vehicle resources are autonomous vehicles, also known as driverless vehicles or driverless cars. Where the system 100 comprises autonomous vehicles, each driver device 110 is replaced with an on-board control system, which can be termed an autonomous mode controller. The autonomous mode controller controls the speed and direction of the autonomous vehicle and maintains an accurate record of the unmanned vehicle's location and orientation. Autonomous driving sensors may include any number of devices configured to generate signals that help navigate the vehicle while the vehicle is operating in an autonomous (e.g., driverless) mode. The autonomous vehicle may comprise a number of cameras and other sensors, including LIDAR and/or radar sensors, which feed information about the vehicle's surroundings to the autonomous mode controller. The information includes the position, constitution, orientation and velocity of nearby objects, including other vehicles. The autonomous driving sensors help the vehicle "see" the roadway and the vehicle surroundings and/or negotiate various obstacles while the vehicle is operating in the autonomous mode. The autonomous mode controller may communicate with the core system 101 via the radio network 111 using any suitable protocol.

The autonomous mode controller may be configured to control one or more subsystems while the vehicle is operating in the autonomous mode. Examples of subsystems that may be controlled by the autonomous mode controller may include a brake subsystem, a suspension subsystem, a steering subsystem, and a powertrain subsystem. The autonomous mode controller may control any one or more of these subsystems by outputting signals to control units associated with these subsystems. The autonomous mode controller may control the subsystems based, at least in part, on signals generated by the autonomous driving sensors.

The autonomous vehicles may have on-board route planning modules as part of the autonomous mode controller. Upon the autonomous vehicle receiving information representing a start and end location for a route, the on-board route planning module accesses the map and location database 109 and optionally traffic data in the historical database 132 and/or live traffic information to calculate a best route. The autonomous vehicle may also be given information representing one or more waypoints to travel to between the start and end locations, or a number of waypoints or locations which can be travelled to in any order. The route planning module may then calculate the most efficient route to take to visit each of the locations.

Alternatively, the autonomous vehicle may not have an on-board route planning module and may instead receive route information, i.e. information specifying one or more routes, or navigation instructions from the core system 101.

The autonomous mode controller of each autonomous vehicle may also be pre-programmed to cause the autonomous vehicle to travel to and wait at a particular location when the vehicle does not have particular start and end points or waypoints to travel to. Alternatively, when the autonomous vehicle is not undertaking a specific journey (i.e. when it is idle), the autonomous mode controller may cause the autonomous vehicle to adhere to one of a number of predetermined circuits or routes. The particular predetermined circuit or route chosen by the autonomous mode controller may depend on the location of the vehicle when it becomes idle.

Figure 12:
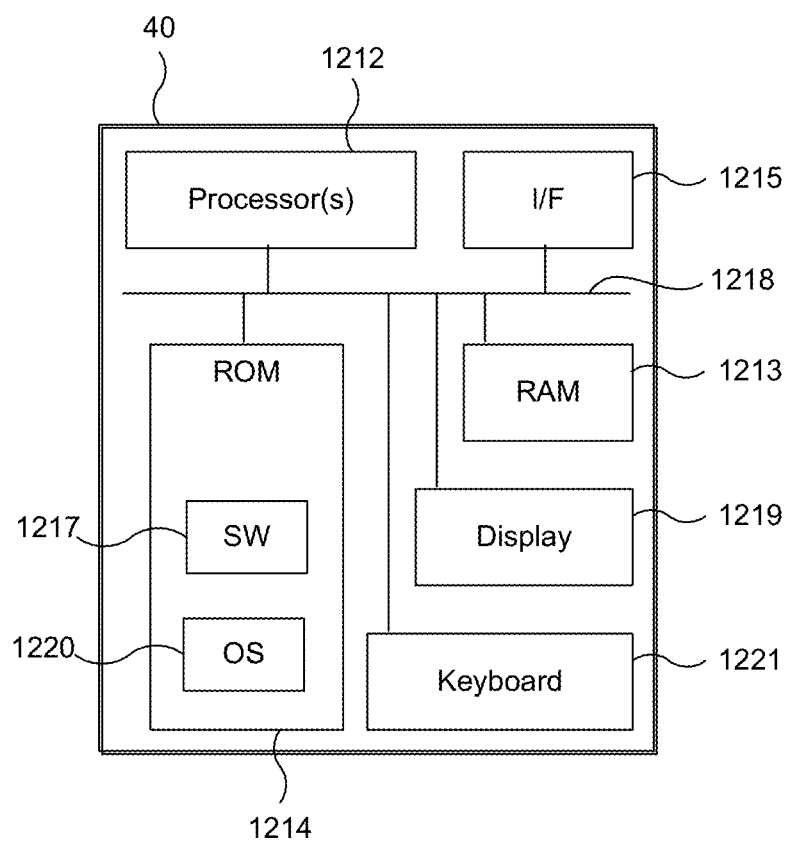
FIG. 12 is a schematic diagram illustrating components of a server forming part of the FIG. 1, FIG. 8a, or FIG. 8b system.

Whether the system 100 includes one or multiple servers, each server includes a number of features as will now be described with reference to FIG. 12. FIG. 12 shows one server 40. If the system 10 and/or the system 100 comprise plural servers, multiple versions of the server 40 may be connected together.

Each server 40 in the system 100 includes a processor 1212. The processor 1212 is connected to volatile memory such as RAM 1213 by a bus 1218. The bus 1218 also connects the processor 112 and the RAM 1213 to non-volatile memory, such as ROM 1214. A communications interface 1215 is coupled to the bus 1218, and thus also to the processor 1212 and the memories 1213, 1214. The interface 1215 is connected to a radio network in any suitable way, for instance via the Internet or a local network. Within the ROM 1214 is stored a software application 1217, which includes program code that causes the server to perform the functions required of it. An operating system (OS) 1220 also is stored in the ROM 1214.

An output device such as a display 1219 may be provided with the server 40. An input device such as a keyboard 1221 may be provided with the server 40. This allows configuration, monitoring and updating by administrators and other users as required.

The server 40 may take any suitable form. Generally speaking, the server 40 comprises processing circuitry 1212, including one or more processors, and a storage device 1214, 1213, comprising a single memory unit or a plurality of memory units. The storage device 1214, 1213 stores computer program instructions that, when loaded into the processing circuitry 1212, control the operation of the server 40.

The term 'memory' when used in this specification is intended to relate primarily to memory comprising both non-volatile memory and volatile memory unless the context implies otherwise, although the term may also cover one or more volatile memories only, one or more non-volatile memories only, or one or more volatile memories and one or more non-volatile memories. Examples of volatile memory include RAM, DRAM, SDRAM etc. Examples of non-volatile memory include ROM, PROM, EEPROM, flash memory, optical storage, magnetic storage, etc.

Reference to "computer-readable storage medium", "computer program product", "tangibly embodied computer program" etc., or a "processor" or "processing circuit" etc. should be understood to encompass not only computers having differing architectures such as single/multi-processor architectures and sequencers/parallel architectures, but also specialized circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

It should be realized that the foregoing embodiments are not to be construed as limiting and that other variations and modifications will be evident to those skilled in the art and are intended to be encompassed by the claims unless expressly excluded by the claim language when taking into account equivalents. Some such alternatives and modifications will now be described.

Instead of the hot spot attraction score calculation including the hot spot attraction distance parameter, the score may instead be calculated without utilizing this parameter. However, a hot spot attraction score may be calculated only for vehicles that are within the hot spot attraction distance of the hot spot.

Instead of a simple direct linear function for the hot spot attraction distance parameter, it may be a more complex function of any suitable form. The same applies to the distance of the vehicle from the hot spot.

The bonus parameter may be omitted from the hot spot attraction score calculation. This prevents weightings being placed on hot spots (at least without adjusting the hot spot attraction distance parameter), but the resulting simplification may be sufficiently worthwhile to warrant the absence of the feature.

In the above a low score indicates better suitability to a booking and the booking is allocated to the vehicle with the lowest score. Of course, the scoring system may be configured the opposite way around, with a high score indicating better suitability to a booking. In this case, a hot spot attraction penalty score is a negative score and a hot spot attraction score is a positive score.

In the above, journey cost calculation is performed at the time of a booking and the result returned to the customer requesting the booking. Cost calculation may alternatively be performed ahead of the booking being made (for instance on the basis of an agreed tariff), at the end of fulfillment of the booking, or at a later time.

Additionally, the cost scoring of a vehicle against a booking may be performed in any suitable way. Also, cost scoring may be performed only once and the best vehicle allocated at that time, rather than cost scoring being performed until it is decided to allocate a vehicle.

Moreover, the disclosure of the present application should be understood to include any novel features or any novel combination of features either explicitly or implicitly disclosed herein or in any generalization thereof and during prosecution of the present application or of any application derived therefrom, new claims may be formulated to cover any such features and/or combination of such features.

The invention claimed is:

1. A system for allocating networked vehicle resources with monitored locations, the system comprising:
   a plurality of requester devices;
   a plurality of vehicle resources, each vehicle resource having a respective monitored current location, wherein each vehicle resource is associated with a respective vehicle resource status and with a respective vehicle resource device comprising a positioning component that is configured to determine the current location of the vehicle resource;
   a priority location module configured to define dynamically one or more hot spots; and
   a vehicle resource allocation controller device comprising:
   a processor in communication with the plurality of requester devices, the plurality of vehicle resources, and the priority location module, and
   a computer-readable medium in communication with the processor of the vehicle resource allocation controller device, the computer-readable medium storing instructions that when executed by the processor direct the processor to:
   receive information about a geographical area and, using the priority location module, automatically define a dynamic hot spot in the geographical area;
   store, using the priority location module, information relating to the dynamic hot spot in the geographical area, the information including location information identifying a location relating to the dynamic hot spot;
   receive a request for a vehicle resource from a requester device of the plurality of requester devices;
   automatically identify, using the priority location module and based on the request, that a location relating to the request from the requester device of the plurality of requester devices is outside of the dynamic hot spot;
   identify plural vehicles, of the plurality of vehicle resources, that are capable of fulfilling the request;
   calculate, using the priority location module, a hot spot attraction score for a first subset of the plural vehicles, wherein each of the vehicles of the first subset has a respective current location that is within a hot spot attraction distance of the dynamic hot spot and wherein the hot spot attraction score is a penalty score for reducing the likelihood that the vehicle will be allocated;

refrain from calculating a hot spot attraction score for a second subset of the plural vehicles, wherein each of the vehicles of the second subset has a respective current location that is not within the hot spot attraction distance of the dynamic hot spot and wherein the first subset does not overlap with the second subset;

use the hot spot attraction scores to calculate a respective total vehicle score for each of the vehicles of the first subset of the plural vehicles in relation to the request;

calculate a respective total vehicle score for each of the vehicles of the second subset of the plural vehicles in relation to the request;

use the respective total vehicle scores calculated for the plural vehicles to select a vehicle of the plural vehicles to allocate to the request;

allocate the selected vehicle to the request; and in response to allocating the selected vehicle to the request, automatically transmit a signal to a vehicle resource device associated with the selected vehicle, the signal indicating that the selected vehicle is to fulfil the request.

2. The system of claim 1, the computer-readable medium further storing instructions that when executed by the processor direct the processor to:

receive, from each vehicle of the plural vehicles, an indication of the vehicle's monitored current location.

3. The system of claim 1, the computer-readable medium further storing instructions that when executed by the processor direct the processor to:

receive, for each vehicle of the plural vehicles and from a location service in communication with the vehicle, an indication of the vehicle's monitored current location.

4. The system of claim 1, wherein the request comprises a request for a first responder vehicle.

5. The system of claim 1, wherein the request comprises a customer booking for a private hire vehicle.

6. The system of claim 1, wherein the location relating to the request comprises a drop off location or a pick up location.

7. The system of claim 1, wherein the request comprises a request to send a vehicle to a search location.

8. The system of claim 1, wherein the information relating to the dynamic hot spot includes the hot spot attraction distance, and wherein calculating a hot spot attraction score for the first subset of the plural vehicles comprises using the hot spot attraction distance and the location associated with the request to calculate the hot spot attraction score.

9. The system of claim 1, the computer-readable medium further storing instructions that when executed by the processor direct the processor to: provide a user interface to allow a user to specify the hot spot attraction distance.

10. The system of claim 1, wherein the information relating to the dynamic hot spot includes one or more vehicle types and wherein the first subset of vehicles includes only vehicles associated with a vehicle type that matches a vehicle type included in the information relating to the dynamic hot spot.

11. The system of claim 1, wherein the information relating to the dynamic hot spot includes information defining an area to which vehicles are attracted.

12. The system of claim 10, wherein the geographical area is defined by a postcode area or administrative district.

13. The system of claim 1, the computer-readable medium further storing instructions that when executed by the processor direct the processor to:

use a destination location for a second request that is being fulfilled by a vehicle in calculating the respective total vehicle score for the vehicle against the request.

14. A method for allocating networked vehicle resources with monitored locations, the method comprising:

receiving information about a geographical area and automatically defining a dynamic hot spot in the geographical area;

storing, by a vehicle resource allocation controller device, information relating to the dynamic hot spot in the geographical area, the information including location information identifying a location relating to the dynamic hot spot, wherein the vehicle resource allocation controller device is in communication with:

a plurality of requester devices, and a plurality of vehicle resources, each vehicle resource having a respective monitored current location, wherein each vehicle resource is associated with a respective vehicle resource status and with a respective vehicle resource device comprising a positioning component that is configured to determine the current location of the vehicle resource;

receiving a request for a vehicle resource from a requester device of the plurality of requester devices;

automatically identifying, by the vehicle resource allocation controller device based on the request, that a location relating to the request from the requester device of the plurality of requester devices is outside of the dynamic hot spot;

identifying, by the vehicle resource allocation controller device, plural vehicles, of the plurality of vehicle resources, that are capable of fulfilling the request;

calculating, by the vehicle resource allocation controller device, a hot spot attraction score for a first subset of the plural vehicles wherein each of the vehicles of the first subset has a respective current location that is within a hot spot attraction distance of the dynamic hot spot and wherein the hot spot attraction score is a penalty score for reducing the likelihood that the vehicle will be allocated;

refraining from calculating a hot spot attraction score for a second subset of the plural vehicles, wherein each of the vehicles of the second subset has a respective current location that is not within the hot spot attraction distance of the dynamic hot spot and wherein the first subset does not overlap with the second subset;

using, by the vehicle resource allocation controller device, the hot spot attraction scores to calculate a respective total vehicle score for each of the vehicles of the first subset of the plural vehicles in relation to the request;

calculating, by the vehicle resource allocation controller device, a respective total vehicle score for each of the vehicles of the second subset of the plural vehicles in relation to the request;

using, by the vehicle resource allocation controller device, the respective total vehicle scores calculated for the plural vehicles to select a vehicle of the plural vehicles to allocate to the request;

allocating, by the vehicle resource allocation controller device, the selected vehicle to the request; and in response to allocating the selected vehicle to the request, automatically transmitting a signal to a vehicle resource device associated with the selected vehicle, the signal indicating that the selected vehicle is to fulfil the request.

15. An apparatus for allocating networked vehicle resources with monitored locations, the apparatus comprising:
a processor in communication with:
a plurality of requester devices, and
a plurality of vehicle resources, each vehicle resource having a respective monitored current location, wherein each vehicle resource is associated with a respective vehicle resource status and with a respective vehicle resource device comprising a positioning component that is configured to determine the current location of the vehicle resource; and
a computer-readable medium in communication with the processor, the computer-readable medium storing instructions that when executed by the processor direct the processor to:
receive information about a geographical area and, using a priority location module, automatically define a dynamic hot spot in the geographical area;
store information relating to the dynamic hot spot in the geographical area, the information including location information identifying a location relating to the dynamic hot spot;
receive a request for a vehicle resource from a requester device of the plurality of requester devices;
automatically identify, based on the request, that a location relating to the request from the requester device of the plurality of requester devices is outside of the dynamic hot spot;
identify plural vehicles, of the plurality of vehicle resources, that are capable of fulfilling the request;
calculate a hot spot attraction score for a first subset of the plural vehicles wherein each of the vehicles of the first subset has a respective current location that is within a hot spot attraction distance of the dynamic hot spot and wherein the hot spot attraction score is a penalty score for reducing the likelihood that the vehicle will be allocated;
refrain from calculating a hot spot attraction score for a second subset of the plural vehicles, wherein each of the vehicles of the second subset has a respective current location that is not within the hot spot attraction distance of the dynamic hot spot and wherein the first subset does not overlap with the second subset;
use the hot spot attraction scores to calculate a respective total vehicle score for each of the vehicles of the first subset of the plural vehicles in relation to the request;
calculate a respective total vehicle score for each of the vehicles of the second subset of the plural vehicles in relation to the request;
use the respective total vehicle scores calculated for the plural vehicles to select a vehicle of the plural vehicles to allocate to the request;
allocate the selected vehicle to the request; and
in response to allocating the selected vehicle to the request, automatically transmit a signal to a vehicle resource device associated with the selected vehicle, the signal indicating that the selected vehicle is to fulfil the request.

16. A system for allocating networked vehicle resources with monitored locations, the system comprising:
a plurality of requester devices;
a plurality of vehicle resources, each vehicle resource having a respective monitored current location, wherein each vehicle resource is associated with a respective vehicle resource status and with a respective vehicle resource device comprising a positioning component that is configured to determine the current location of the vehicle resource;
a priority location module configured to define dynamically one or more hot spots; and
a vehicle resource allocation controller device comprising:
a processor in communication with the plurality of requester devices, the plurality of vehicle resources, and the priority location module, and
a computer-readable medium in communication with the processor of the vehicle resource allocation controller device, the computer-readable medium storing instructions that when executed by the processor direct the processor to:
receive information about a geographical area and, using the priority location module, automatically define a dynamic hot spot in the geographical area;
store, using the priority location module, information relating to the dynamic hot spot in the geographic area, the information identifying a location relating to the dynamic hot spot and information identifying one or more vehicle types, the one or more vehicle types each indicating types of vehicles that are to be attracted to the dynamic hot spot;
receive a request for a vehicle resource from a requester device of the plurality of requester devices;
automatically identify, using the priority location module and based on the request, that the request from the requester device of the plurality of requester devices has a requested location that is at or near to the location relating to the dynamic hot spot and that the request relates to a vehicle type that is not one of the types of vehicles that are to be attracted to the dynamic hot spot;
identify plural vehicles, of the plurality of vehicle resources, that are capable of fulfilling the request;
calculate, using the priority location module, a hot spot attraction score for a first subset of the plural vehicles, wherein the first subset of the plural vehicles includes only vehicles associated with a vehicle type that matches one of the one or more vehicle types included in the information relating to the dynamic hot spot and wherein the hot spot attraction score is a bonus score that increases the chances of the vehicle being allocated to the request;
refrain from calculating a hot spot attraction score for a second subset of the plural vehicles, wherein the second subset of the plural vehicles does not include vehicles associated with the vehicle type that matches the vehicle type included in the information relating to the dynamic hot spot and wherein the first subset does not overlap with the second subset;
use the hot spot attraction scores to calculate a respective total vehicle score for each of the vehicles of the first subset of the plural vehicles in relation to the request;
calculate a respective total vehicle score for each of the vehicles of the second subset of the plural vehicles in relation to the request;
use the respective total vehicle scores calculated for the plural vehicles to select a vehicle of the plural vehicles to allocate to the request;
allocate the selected vehicle to the request; and
in response to allocating the selected vehicle to the request, automatically transmit a signal to a vehicle resource device associated with the selected vehicle, the signal indicating that the selected vehicle is to fulfil the request.

17. The system of claim 16, the computer-readable medium further storing instructions that when executed by the processor direct the processor to calculate a hot spot attraction score for the first subset of the plural vehicles by receiving an indication of the respective monitored current location of each vehicle of the first subset.

18. The system of claim 16, the computer-readable medium further storing instructions that when executed by the processor direct the processor to receive an indication of the monitored current location of each vehicle of the plural vehicles by receiving, from each vehicle, the indication of the respective monitored current location of the vehicle.

19. The system of claim 16, the computer-readable medium further storing instructions that when executed by the processor direct the processor to receive an indication of the monitored current location of each vehicle of the plural vehicles by receiving, from a location service in communication with the vehicle, the indication of the respective monitored current location of the vehicle.

20. The system of claim 16, wherein the request comprises a request for a first responder vehicle.

21. The system of claim 16, wherein the request comprises a customer booking for a private hire vehicle.

22. The system of claim 16, wherein the requested location of the request comprises a drop off location or a pick up location.

23. The system of claim 16, wherein the request comprises a request to send a vehicle to a search location.

24. The system of claim 16,
wherein the information relating to the dynamic hot spot includes information identifying an attraction distance to the dynamic hot spot; and
wherein automatically identifying that a request has a requested location that is at or is close to the location of the dynamic hot spot comprises identifying that the requested location is within the attraction distance of the dynamic hot spot.

25. The system of claim 24, the computer-readable medium further storing instructions that when executed by the processor direct the processor to:
provide a user interface to allow a user to specify the attraction distance to the dynamic hot spot.

26. The system of claim 24,
wherein identifying that the requested location is within the attraction distance of the dynamic hot spot comprises calculating a direct distance between the requested location and the dynamic hot spot and comparing the calculated direct distance to the attraction distance.

27. The system of claim 24, wherein calculating the hot spot attraction score comprises using the attraction distance in calculating the hot spot attraction score.

\* \* \* \* \*